(12) United States Patent
Matsushita

(10) Patent No.: US 6,217,230 B1
(45) Date of Patent: Apr. 17, 2001

(54) RECEPTACLE, MANUFACTURING METHOD FOR THE SAME, AND OPTICAL CONNECTOR HAVING THE RECEPTACLE

(75) Inventor: Junichi Matsushita, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/538,232

(22) Filed: Mar. 30, 2000

(30) Foreign Application Priority Data

Sep. 16, 1999 (JP) .................................................. 11-261679
Sep. 16, 1999 (JP) .................................................. 11-261680

(51) Int. Cl.⁷ .............................. G02B 6/00; G02B 6/36
(52) U.S. Cl. ............................................................. 385/78
(58) Field of Search .................................. 385/77–89, 147

(56) References Cited

U.S. PATENT DOCUMENTS 4,595,251 * 3/1998 Braun et al. ........................ 250/551
4,711,752 * 12/1987 Decaon et al. .................. 264/328.12
5,455,880 * 10/1995 Reid et al. .............................. 385/87
5,729,644 * 3/1998 Shiflett et al. ......................... 385/59

FOREIGN PATENT DOCUMENTS 6-33443   8/1994 (JP) .

* cited by examiner

Primary Examiner—Akm E. Ullah
(74) Attorney, Agent, or Firm—Armstrong, Westerman, Hattori, McLelland & Naughton, LLP

(57) ABSTRACT

The receptacle includes a lead pin having an optical element, a molded body made of a transparent resin material allowing optical propagation, and an optical element module sub-assembly having a core unitarily molded with the molded body by utilizing a transparent resin material. The receptacle comprises a connector housing unitarily molded with the optical element module sub-assembly by using a transparent material having a refractive index smaller than that of the core. Another receptacle includes an element module sub-assembly which has a lead pin with an optical element and a molded body. The molded body has a recess for positioning a leading end of a ferrule closely to the optical element. The another receptacle also comprises a connector housing having an insertion through hole and an engagement chamber for an optical plug. The optical element module sub-assembly is unitarily assembled with the connector housing.

23 Claims, 19 Drawing Sheets

RECEPTACLE, MANUFACTURING METHOD FOR THE SAME, AND OPTICAL CONNECTOR HAVING THE RECEPTACLE

BACKGROUND OF THE INVENTION

1. Field of the Invention

The present invention relates to an optical (fiber) connector, for example, used in a multiplex transmission line of an automotive vehicle, a receptacle provided in the optical connector, and a manufacturing method for the receptacle.

2. Prior Art

There has been a generally known optical connector (disclosed in Japanese Utility Model Laid-open No. H. 6-33443) that was proposed by the same assignee of the present application. The optical connector has an optical fiber cable, an optical element module, and a sleeve provided therebetween. The optical element module is also called as a light-receiving/light-emitting optical module, a transmission module, an FOT (Fiber Optic Transceiver), or the like.

Referring to FIG. 27, there is shown the optical connector, in which denoted 201 is the sleeve and 202 the optical connector.

The sleeve 201 is mounted in a receptacle 203 (an instrument side connector) composing the optical connector 202. The receptacle 203 accommodates a pair of optical element modules 204, 204 (a light-emitting element module 204 and a light-receiving element module 204). There is also shown an optical plug (an optical fiber cable side connector) 205 provided with a pair of optical fiber cables 206, 206 (one of them is illustrated). The optical plug 205 is an optical connector mating with the receptacle 203 via the sleeve 201 that optically connects the optical element modules 204, 204 to the optical fiber cables 206, 206.

The optical connector 202 will be discussed in detail together with the sleeves 201, 201. The optical connector 202 has the receptacle 203 and the optical plug 205 mating with each other.

The receptacle 203, as illustrated in FIGS. 27 and 28, has a synthetic resin housing 207 including accommodation chambers 208, 208 in each of which an optical element module 204 made of an elastic material like a rubber is held by a back sheet 209. In a rear face of the housing 207, there is provided a cap 210 attached thereto. At the front of the accommodation chambers 208, 208 holding the optical element modules 204, 204, there is provided a pair of receiving cylinders 212, 212 each extending coaxialy with one of lenses 211, 211. The receiving cylinders 212, 212 each receive one of the sleeves 201, 201 inserted therein.

The sleeve 201 consists of a cylindrical holder 214 and an optical fiber cable 213 (a plastic, multi-mode optical fiber cable) bonded to the holder 214. The optical fiber cable 213 consists of a core and a cladding (not shown). The sleeve 201 has each end surface given an extremely precise grinding.

Meanwhile, the optical plug 205 mating with the receptacle 203, as illustrated in FIGS. 27 and 29, has a pair of ferrule assemblies 215, 215, a plug housing 217, a spring cap 218 engagedly secured to the plug housing 217, and a boot 219 engagedly secured to a rear portion of the spring cap 218. The ferrule assemblies 215, 215 cover the optical fiber cables 206, 206, each of which has an exposed leading end extending forward. The plug housing 217 has a cylindrical partition 216 for protecting the ferrule assemblies 215, 215 received therein.

The plug housing 217 also has shoulders 217a, 217a abutting against rim flanges 215a, 215a each outwardly formed on a rear half of the ferrule assembly 215. Between the flange 215a and an inner cylinder 218a of the spring cap 218, there is mounted a spring 220 for resiliently biasing forward the ferrule assembly 215.

When the flange 215a is abutting against the shoulder 217a (FIG. 29), a fore end portion a of the ferrule assembly 215 (corresponding to the position of a light receiving/emitting end surface of the optical fiber cable 206 as illustrated in FIG. 29) is not extending from a fore end b (FIG. 29) of the plug housing 217 to stay at a withdrawn position therein.

Referring to FIG. 27, the receptacle 203 and the optical plug 205 having such constitutions will be further discussed in electrical and optical connection thereof On engagement of the receptacle 203 and the optical plug 205, the receiving cylinders 212, 212 enter the plug housing 217, and at the same time, the ferrule assemblies 215, 215 enter the receiving cylinders 212, 212. Each ferrule assembly 215 abuts against a leading end of the receiving cylinder 212 with an adequate contact pressure therebetween by the resiliency of the spring 220.

In this state, between the leading end a (FIG. 29) and the sleeve 201, there is only a minimum clearance (not shown), minimizing a clearance optical loss thereof.

Nevertheless, the aforementioned prior art has the housing 207 that accommodates the sleeves 201, 201 and the optical element modules 204, 204 inserted therein. This assembling work is very laborious and is not good in workability, resulted in a higher manufacturing cost.

Furthermore, the sleeve 201 and the optical element module 204 are defined separately from each other, which provides clearances therebetween. Such clearances cause another optical loss (clearance loss) in addition to the clearance loss between the leading end a (FIG. 29) and the sleeve 201. This may cause an adverse effect on an optical communication thereof.

Moreover, the receptacle 203 is completed after a plurality of steps each forming the housing 207, the optical element module 204, the sleeve 201, and the cap 210, together with steps for sequentially assembling these constitutions. The large number of steps cause a higher manufacturing cost.

In addition, the assembling step of the optical element module 204 includes a forming step of the lead pin (no reference numeral) having an optical element and a molding step of a body (no reference numeral) from a transparent resin for protecting the lead pin.

SUMMARY OF THE INVENTION

In view of the above-mentioned disadvantages of the prior art, an object of the present invention is to provide an optical connector having a receptacle that allows a less optical loss, a reduced cost, and an improved workability in assembling. The present invention also provides a manufacturing method of the receptacle. Another object of the invention is to provide an optical connector less in manufacturing cost with achieving a satisfactory optical communication.

For achieving the first object, an aspect 1 of the present invention is a manufacturing method for a receptacle for receiving an optical plug which is connected to an optical fiber cable and has a ferrule at one end thereof. The method includes the steps of:

forming a lead pin (or lead frame) having an optical element of a light-emitting element or a light-receiving element, forming a molded body and a core to define an optical element module sub-assembly, the molded body protecting the optical element, the molded body and core being made from a light-propagating transparent resin material to be assembled unitarily with the lead pin, the core extending from the molded body in such a direction as to align with the optical element, and forming a transparent housing unitarily with the optical element module sub-assembly, the housing having a cladding portion surrounding the core and an engagement chamber for the optical plug, the transparent housing having a refractive index smaller than the transparent resin material of the molded body.

An aspect 2 of the present invention is a receptacle manufacturing method dependent on the aspect 1, wherein the lead pin is joined to a carrier during the step for forming the lead pin, and the lead pin joined to the carrier is transferred to a next step.

An aspect 3 of the present invention is a receptacle manufacturing method dependent on the aspect 2, wherein the carrier is joined a plurality of the lead pins in which the lead pin having the light-emitting element and the lead pin having the light-receiving element are arranged in after one another relationship.

An aspect 4 of the present invention is a receptacle manufacturing method dependent on the aspect 2 or 3, wherein after the next step, there is provided a cutting step for cutting off the carrier.

An aspect 5 of the present invention is a receptacle manufacturing method dependent on any of the aspects 1 to 4, wherein two of lead pins are provided, and there is formed a shade between the light-emitting element and the light-receiving element for separating the optical elements to assemble the optical element module sub-assembly.

An aspect 6 of the present invention is a receptacle manufacturing method dependent on any of the aspects 1 to 5, wherein after unitarily assembling the housing with the optical element module sub-assembly, there is provided a conductive coating on the housing.

An aspect 7 of the present invention is a receptacle for receiving an optical plug which is connected to an optical fiber cable and has a ferrule at one end thereof. The receptacle includes:

a lead pin having an optical element of a light-emitting element or a light-receiving element, an optical element module sub-assembly having a molded body and a core, the molded body being molded unitarily on the lead pin from a light-propagating transparent resin material for protecting the optical element, the core being molded unitarily with the molded body from the transparent resin material in such a direction as to extend from the molded body, and a transparent housing defined unitarily with the optical element module sub-assembly, the housing having a cladding portion surrounding the core and an engagement chamber for the optical plug, the transparent housing having a refractive index smaller than the transparent resin material of the molded body.

An aspect 8 of the present invention is a receptacle dependent on the aspect 7, wherein two of lead pins are provided, and there is formed a shade between the light-emitting element and the light-receiving element for separating the optical elements to assemble the optical element module sub-assembly.

An aspect 9 of the present invention is a receptacle dependent on the aspect 7 or 8, wherein the housing has at least one conductor coated portion.

For achieving the second object, an aspect 10 is an optical connector comprising the receptacle manufactured in the receptacle manufacturing method of the aspect 1 or 6 and an optical plug, the optical plug having optical fiber cable which has a ferrule at one end thereof for engaging with the receptacle.

For achieving the second object, an aspect 11 is an optical connector comprising the receptacle of the aspect 7 or 9 and an optical plug, the optical plug having optical fiber cable which has a ferrule at one end thereof for engaging with the receptacle.

For achieving the first object, an aspect 12 of the present invention is a receptacle for receiving an optical plug which is connected to an optical fiber cable and has a ferrule at one end thereof. The receptacle includes:

a lead pin having an optical element of a light-emitting element or a light-receiving element, an optical element module sub-assembly having a molded body, the molded body being molded unitarily on the lead pin from a light-propagating transparent resin material for protecting the optical element, the molded body having a recess for closely opposing a leading end of the ferrule to the optical element, and a housing having an engagement chamber for receiving the optical plug and a through hole passing the leading end of the optical plug, wherein the optical element module sub-assembly and the housing are unitarily assembled with each other.

An aspect 13 of the present invention is a receptacle dependent on the aspect 12, wherein there is provided a shade between the housing and the molded body for separating the optical elements when the receptacle has two of the lead pins.

An aspect 14 of the present invention is a receptacle dependent on the aspect 12, wherein the housing is made of an electrically conductive synthetic resin.

For achieving the first object of, an aspect 15 of the present invention is a manufacturing method of a receptacle for receiving an optical plug which is connected to an optical fiber cable and has a ferrule at one end thereof. The method includes the steps of:

forming a lead pin having an optical element of a light-emitting element or a light-receiving element, forming an optical element module sub-assembly having a molded body, the molded body being molded from a light-propagating transparent resin material for protecting the optical element to be unitarily assembled with the lead pin, the molded body having a recess for closely opposing a leading end of the ferrule to the optical element, and unitarily molding a housing on the optical element module, the housing having an engagement chamber for receiving the optical plug and a through hole passing through a leading end of the optical plug via the engagement chamber.

For achieving the first object, an aspect 16 of the present invention is a manufacturing method for a receptacle for receiving an optical plug which is connected to an optical fiber cable and has a ferrule at one end thereof. The method includes the steps of:

forming a lead pin having an optical element of a light-emitting element or a light-receiving element, forming a housing, the housing having an engagement chamber for receiving the optical plug, a receiving space for the lead pins, and an insertion hole passing a leading end of the ferrule, the insertion hole communicating with the engagement chamber and the receiving space, receiving the lead pin in the receiving space so as to oppose the optical element to the insertion through hole, and defining an optical element module unitarily in the housing by filling a light-propagating transparent resin material in the receiving space to protect the optical element and by forming a recess for closely opposing a leading end of the ferrule to the optical element.

An aspect 17 of the present invention is a receptacle manufacturing method dependent on the aspect 15 or 16, wherein there is provided a shade in the housing or the molded body for preventing a ray of the light-emitting element from entering the light-receiving element when the receptacle has two of the lead pins.

An aspect 18 of the present invention is a receptacle manufacturing method dependent on the aspect 15 or 17, wherein the lead pin is joined to a carrier defined during the step for forming the lead pin and the lead pin joined to the carrier is transferred to the next step.

An aspect 19 of the present invention is a receptacle manufacturing method dependent on the aspect 18, wherein the carrier is joined to two of the lead pins in which the lead pin having the light-emitting element and the lead pin having the light-receiving element are positioned alternately.

An aspect 20 of the present invention is a receptacle manufacturing method dependent on the aspect 18 or 19, wherein after the next step, there is provided a cutting step for cutting off the carrier.

An aspect 21 of the present invention is a receptacle manufacturing method dependent on one of the aspects 15 to 19, wherein the housing is made of an electrically conductive synthetic resin.

An aspect 22 of the present invention is an optical connector which comprises a receptacle manufactured in the receptacle manufacturing method of the aspect 12 or 14 and an optical plug, the optical plug having optical fiber cable which has a ferrule at one end thereof for engaging with the receptacle.

An aspect 23 of the present invention is an optical connector which comprises the receptacle of one of the aspects 16 to 21, the optical plug having optical fiber cable which has a ferrule at one end thereof for engaging with the receptacle.

In the aspect 1 of the present invention, the manufacturing steps thereof are fewer in number than those of the prior-art receptacle and provide an improvement in workability (the constitutional components described in the prior art each are called as prior-art one in the specification descriptions hereinafter to avoid confusion with a similar member of the present invention).

That is, in the present invention, the combination of the core of the optical element module sub-assembly and the cladding portion of the housing provides the same function of the prior-art sleeve. This eliminates the step of the prior-art sleeve. The optical fiber cable is bonded to the cylindrical holder. Thus, there is no need for grinding each end of the core with a maximum precision. Furthermore, the optical element module sub-assembly is unitarily formed with the housing, which eliminates the prior-art step of forming the cap. In addition, the steps of the present invention are more simplified than the prior-art steps.

The steps of the present invention provides an improvement in workability. Nevertheless, the present invention provides the function of the prior-art sleeve. On engagement of an optical plug with the receptacle, that is, with the engagement chamber of the housing, an end of the optical fiber cable can be connected to the core in the same way as the opposing prior-art sleeve. In the present invention, there is no such clearance as provided between the prior-art sleeve and the prior-art optical element module, reducing the clearance loss thereof.

Hence, the manufacturing method advantageously achieves an improvement in manufacturing workability, a less optical loss, and a reduced cost of the receptacle.

In the aspect 2 of the present invention, first, the lead pin joined to the carrier is stable in a forming work of the next step. That is, when the lead pin consists of a plurality of members, the lead pin joined to the carrier is generally more convenient in handling thereof.

Second, the lead pin is retained with ease. That is, the carrier provides an increased retaining area and is advantageous for holding the lead pin within a forming metal mold.

Third, when the receptacle has two of the lead pins, the provision of the carrier is advantageous for an easy alignment of the lead pins in forming the optical element module sub-assembly or in unitarily mounting the housing in the optical element module sub-assembly.

Hence, the manufacturing method advantageously achieves an improvement in manufacturing workability and a reduced cost of the receptacle.

In the aspect 3 of the present invention, a reduced man-hour is achieved, particularly in the assembling step of the optical element module sub-assembly. Furthermore, a couple of the optical element module sub-assemblies are easily positioned adequately apart from each other. Moreover, the molded body is easily formed across the two lead pins.

Hence, the manufacturing method advantageously achieves an improvement in manufacturing workability and a reduced cost of the receptacle.

In the aspect 4 of the present invention, there is no need for cutting the carrier during the lead pin forming step, providing the same advantageous effects as the aspect 2 or 3.

In the aspect 5 of the present invention, there is no possibility that a ray from the light-emitting element enters the light-receiving element.

Hence, this prevents a crosstalk between the optical elements to be useful for an improved optical communication system.

In the aspect 6 of the present invention, at least the housing has an electrical conductivity, which provides a shield (electrical shielding) against an external or internal electrical noise. This is useful for an improved optical communication system.

In the aspect 7 of the present invention, the optical element module sub-assembly and the housing are unitarily assembled in the receptacle. Furthermore, the core of the optical element module sub-assembly and the cladding portion of the housing define a waveguide for a ray, which provides the same function as the prior-art sleeve. Moreover, the receptacle has no such sleeve and cap as the prior-art connector includes. In addition, the optical element module sub-assembly has the core unitarily formed with the molded body so that there is no such clearance as the prior-art receptacle has between the sleeve and the optical element module.

When the receptacle mates with the optical plug, an end of the optical fiber cable can oppose to the core the same as the prior-art sleeve. Thus, a ray emitted from a light-emitting element disposed on one of the lead pins propagates through the molded body and the core and enters a terminal of the optical fiber cable. Meanwhile, a light-receiving element disposed on one of the lead pins receives a ray emitted from the optical fiber cable to propagate through the core and the molded body. The receptacle having a couple of the lead pins each provided with the light-emitting element or the light-receiving element allows the above-mentioned two-way light propagation.

In addition, the optical element module sub-assembly has the core defined unitarily with the molded body so that there is no such clearance as defined between the sleeve and the optical element module of the prior-art receptacle. This minimizes the clearance optical loss to be useful for an improved optical communication system.

Therefore, the present invention provides the receptacle that is improved in manufacturing workability thereof. Furthermore, the receptacle provides a less optical loss and a reduced producing cost.

In the aspect 8 of the present invention, a ray emitted from the light-emitting element never enters the light-receiving element.

Hence, this prevents a crosstalk between the optical elements to be useful for an improved optical communication system.

In the aspect 9 of the present invention, the housing electrical conductivity provides a shield against an outer or inner electrical noise.

In the aspect 10 of the present invention, the optical connector has the advantageous effects described in the aspect 1 or 6.

Thus, the optical connector is reduced in price and is useful for an improved optical communication system.

In the aspect 11 of the present invention, the optical connector has the advantageous effects described in the aspect 7 or 9.

Thus, the optical connector is reduced in price and is useful for an improved optical communication system.

In the aspect 12 of the present invention, the receptacle has one or two of optical element modules and a housing which are unitarily assembled with each other. The receptacle consists of fewer parts than the prior art one.

That is, between the optical element and the terminal of the optical fiber cable, there is disposed the molded body made of the transparent resin material, allowing light-propagation in place of the prior-art sleeve. The housing and the optical element module are unitarily molded, so that it is unnecessary to secure the optical element module to the housing. Thus, the receptacle requires neither the prior-art sleeve nor the prior-art cap. In addition, the prior-art back sheet is also unnecessary. The components fewer than the prior art reduces the receptacle in producing cost and in manufacturing man-hour.

The absence of the prior-art sleeve eliminates a clearance optical loss due to the prior-art sleeve. Without the prior-art sleeve, the light propagation efficiency of the receptacle is satisfactory, since the leading end of the ferrule is inserted into the molded body to closely oppose to the optical element.

In engagement of the receptacle with the optical plug, the optical plug is received in the engagement chamber, and the leading end of the ferrule is inserted into the recess through the insertion through hole. The leading end of the ferrule is opposed to the optical element remarkably closer than the prior art.

Where the lead pin has a light-emitting element, a ray emitted from the light-emitting element propagates in the molded body having a reduced length due to the provision of the recess to enter the terminal of the optical fiber cable. Meanwhile, where the lead pin has a light-receiving element, a ray emitted from the optical fiber cable propa-gates in the molded body having a reduced length to enter the light-receiving element. The receptacle having two lead pins each holding a light-emitting element or a light-receiving element allows the above-mentioned two-way optical propagation.

The absence of the prior-art sleeve eliminates a clearance optical loss due to the prior-art sleeve. Without the prior-art sleeve, the light propagation efficiency of the receptacle is satisfactory when the leading end of the ferrule is inserted into the molded body to closely oppose to the optical element. This is better for an optical transmission system. Hence, the present invention can provide the receptacle improved in manufacturing workability, in optical loss, and in producing cost.

In the aspect 13 of the present invention, a ray emitted from the light-emitting element never enters the light-receiving element.

Thus, a crosstalk therebetween is prevented to be better for an optical communication system.

In the aspect 14 of the present invention, the housing provides a shield against an internal or external electrical noise.

In the aspect 15 of the present invention, the manufacturing steps thereof are fewer in number than those of the prior-art receptacle and provide an improvement in workability.

That is, between the optical element and the terminal of the optical fiber cable, there is the molded body made of a light-propagating transparent resin material in place of the prior-art sleeve. This eliminates the step for forming the sleeve. Thus, it is unnecessary that the optical fiber cable is bonded to the cylindrical holder, and the precise grinding of each end thereof is eliminated. The housing unitarily molded in the optical element module also eliminates the step for providing the prior-art cap. Furthermore, the manufacturing step of the prior-art back sheet is eliminated. Accordingly, the present invention provides a more simplified assembling step than the prior-art, achieving an improved workability of the assembling.

Moreover, the elimination of the prior-art sleeve provides no clearance associated with the prior-art sleeve, thereby achieving a reduced optical loss due to clearance. Without the prior-art sleeve, the light propagation efficiency of the receptacle manufactured by the present invention is satisfactory when the leading end of the ferrule is inserted into the recess of the molded body to closely oppose to the optical element.

Hence, the present invention can advantageously provide the receptacle manufacturing method improved in manufacturing workability, in optical loss, and in producing cost.

In the aspect 16 of the present invention, the manufacturing steps thereof are fewer in number than those of the prior-art receptacle and provide an improvement in workability. The effect is the same as the manufacturing method of the aspect 15.

That is, between the optical element and the terminal of the optical fiber cable, there is the molded body made of a light-propagating transparent resin material in place of the prior-art sleeve. This eliminates the step for forming the sleeve. Thus, it is unnecessary that the optical fiber cable is bonded to the cylindrical holder, and the precise grinding of each end thereof is eliminated. The housing unitarily molded in the optical element module also eliminates the step for providing the prior-art cap. Furthermore, the manufacturing step of the prior-art back sheet is eliminated. Accordingly, the present invention provides a more simplified assembling step than the prior-art, achieving an improved workability of the assembling.

Moreover, the elimination of the prior-art sleeve provides no clearance associated with the prior-art sleeve, thereby achieving a reduced optical loss due to clearance. Without the prior-art sleeve, the light propagation efficiency of the receptacle manufactured by the present invention is satisfactory when the leading end of the ferrule is inserted into the recess of the molded body to closely oppose to the optical element.

Hence, in the same way as the method of the aspect 15, the present invention can advantageously provide the receptacle manufacturing method improved in manufacturing workability, in optical loss, and in producing cost.

In the aspect 17 of the present invention, a ray emitted from the light-emitting element never enters the light-receiving element.

The unitarily assembling of the optical element module and the housing provides the shade portion arranged across the housing and the molded body.

Thus, a crosstalk therebetween is prevented to be better for an optical communication system.

In the aspect 18 of the present invention, first, the lead pin joined to the carrier is stable in a forming work of the next step. That is, when the lead pin consists of a plurality of members, the lead pin joined to the carrier is generally more convenient in handling thereof Second, the lead pin is retained with ease. That is, the carrier provides an increased retaining area and is advantageous for holding the lead pin within a forming metal mold.

Third, when the receptacle has two of the lead pins, the provision of the carrier is advantageous for an easy alignment of the lead pins in forming the optical element module sub-assembly or in unitarily mounting the housing in the optical element module sub-assembly.

Hence, the present invention can advantageously provide the receptacle manufacturing method improved in manufacturing workability and in producing cost.

In the aspect 19 of the present invention, the manufacturing method dependent on the aspect 15 allows a man-hour reduction in the step of assembling the element module. The pair of optical element modules are easily correctly positioned to each other. The molded body is easily molded on and across the pair of the lead pins. The manufacturing method of the aspect 15 enables the housing to accommodate the two lead pins in its receiving space. As described above, the pair of lead pins are easily correctly positioned to each other.

Hence, the present invention can advantageously provide the receptacle manufacturing method improved in manufacturing workability and in producing cost.

In the aspect 20 of the present invention, there is no need for cutting the carrier during the lead pin forming step, giving the same advantageous effects as the aspect 18 or 19.

In the aspect 21 of the present invention, at least the housing has an electrical conductivity, which provides a shield (electrical shielding) against an external or internal electrical noise.

In the aspect 22 of the present invention, the optical connector has the advantageous effects described in the aspect 12 or 14.

Thus, the optical connector has a lower price and is better for an optical system.

In the aspect 23 of the present invention, the optical connector has the advantageous effects described in one of the aspects 15 to 20.

Thus, the optical connector has a lower price and is better for an optical system.

DETAILED DESCRIPTION OF THE PREFERRED EMBODIMENTS

Referring to the accompanied drawings, embodiments of the present invention will be discussed hereinafter.

Figure 1:
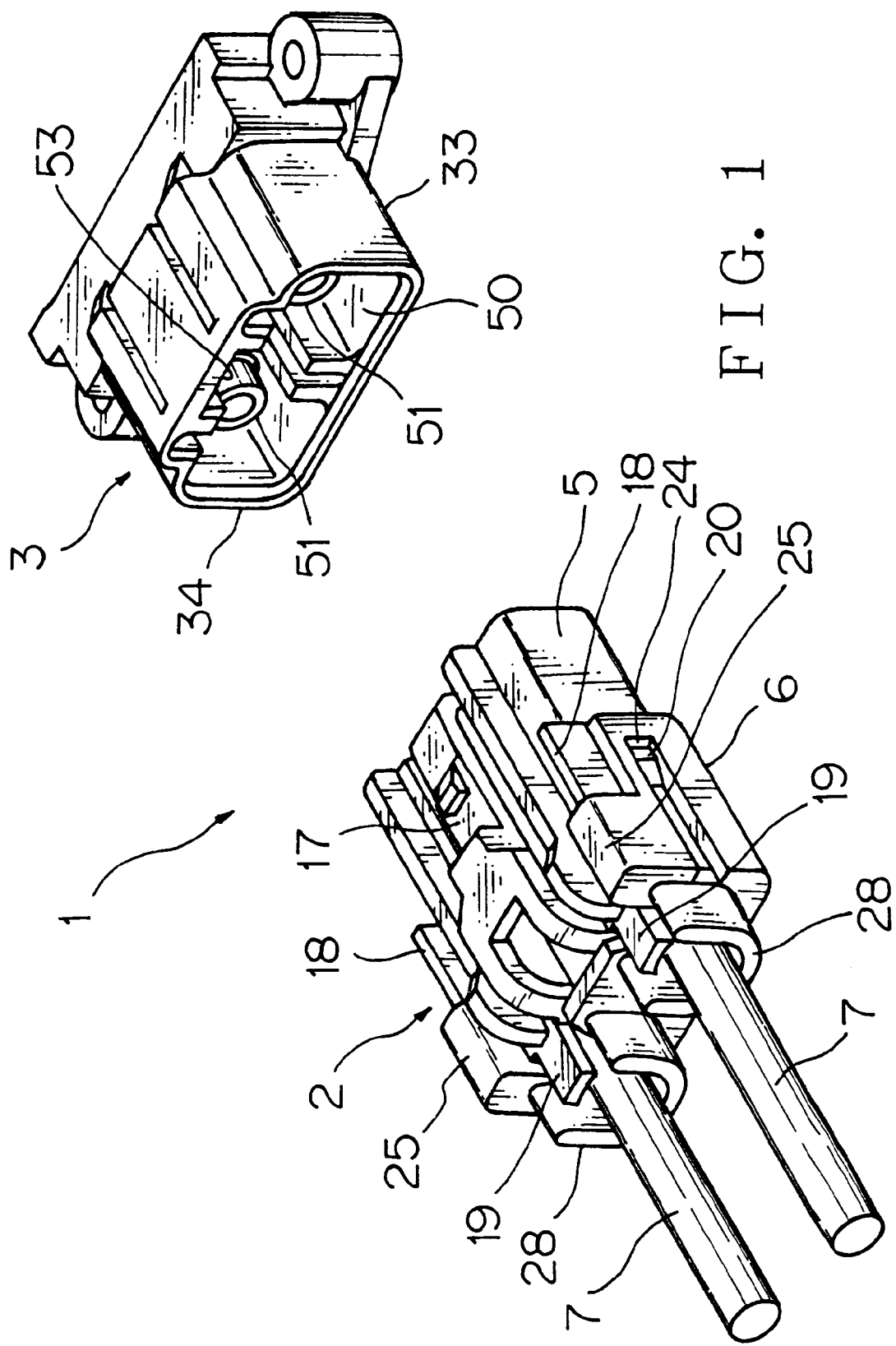
FIG. 1 is an exploded perspective view showing a first embodiment of an optical connector having a receptacle according to the present invention.
Figure 2:
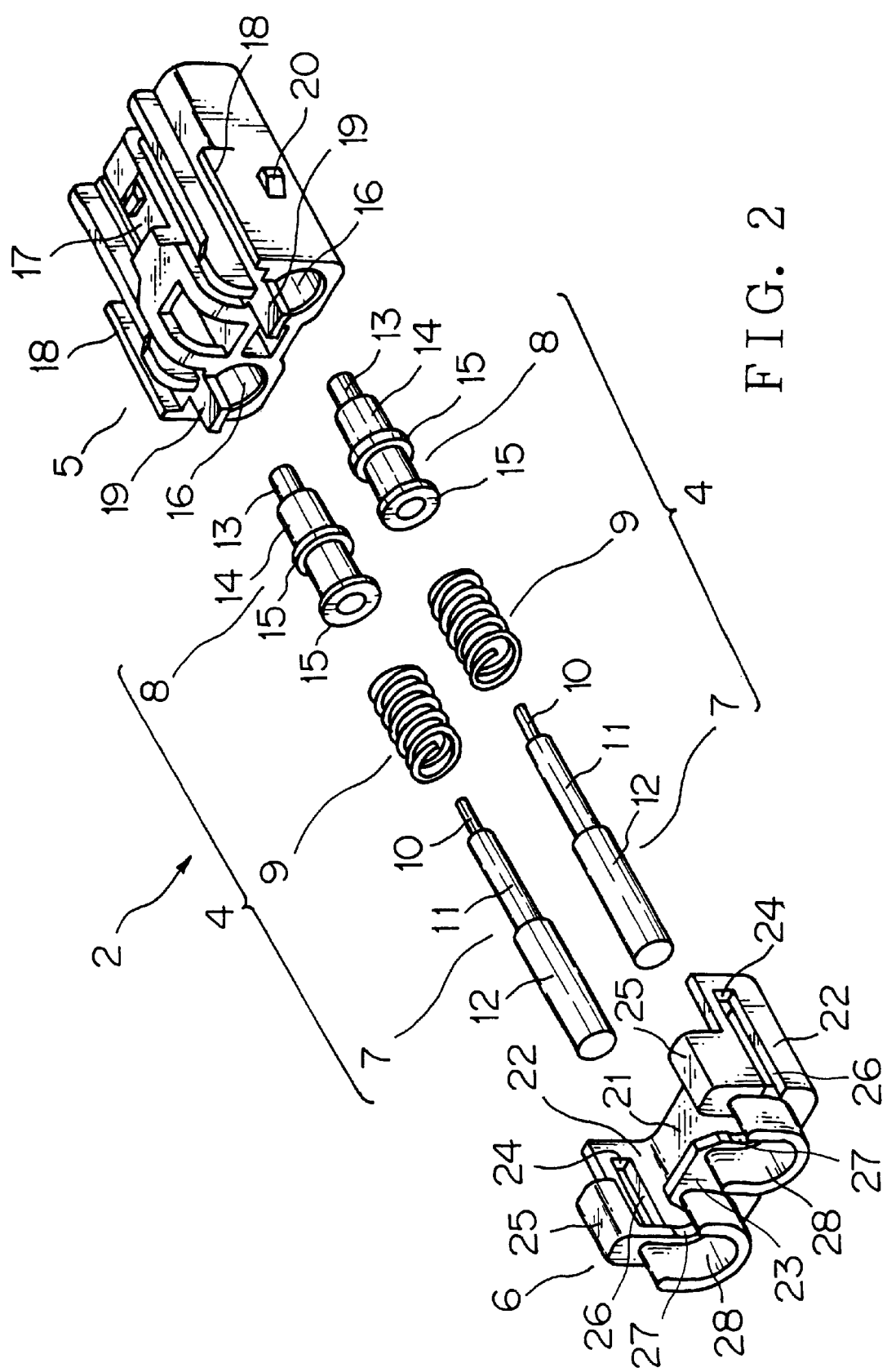
FIG. 2 is an exploded perspective view showing an optical plug of FIG. 1.
Figure 3:
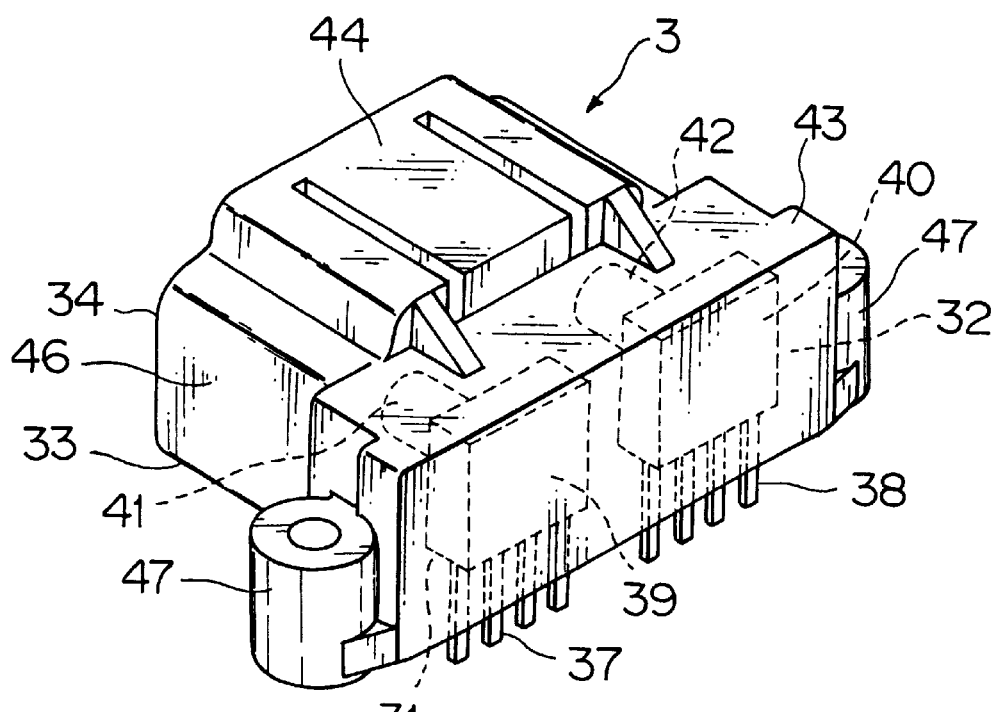
FIG. 3 is a perspective rear view showing the receptacle of FIG. 1.
Figure 4:
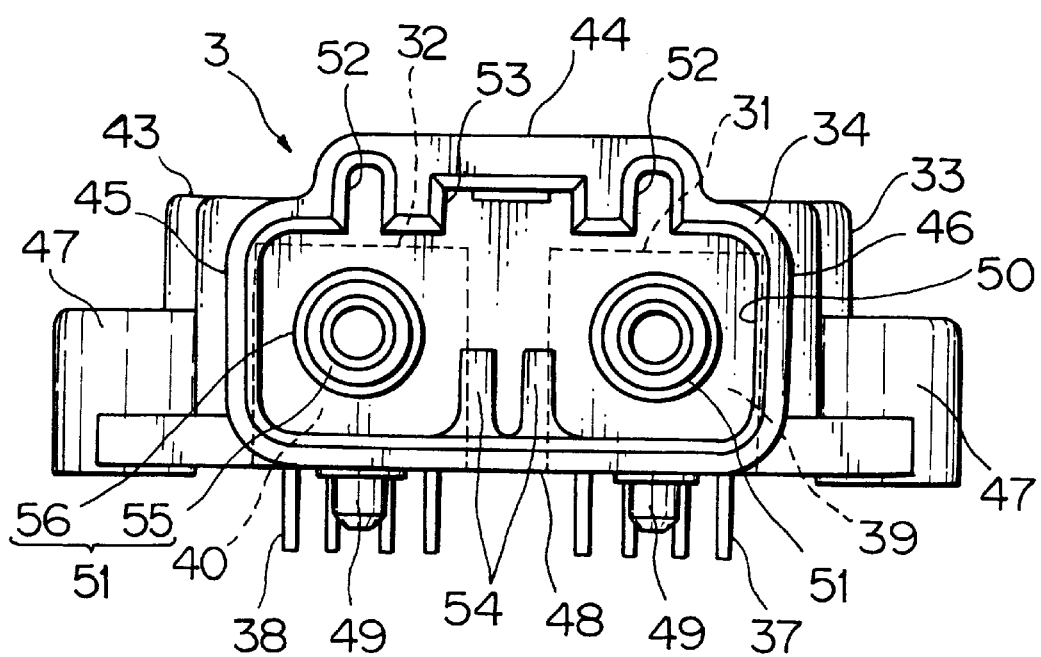
FIG. 4 is a front view showing the receptacle of FIG. 1.
Figure 5:
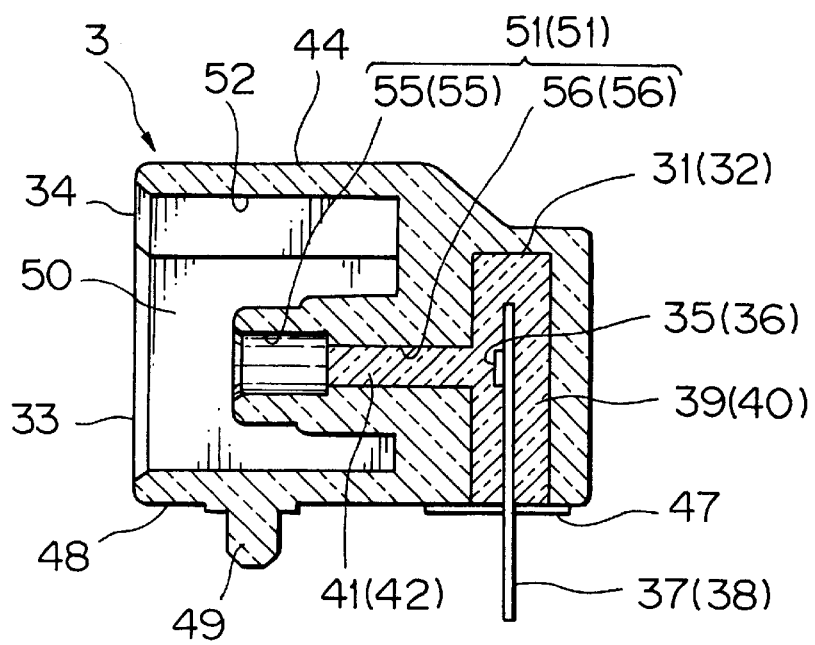
FIG. 5 is a longitudinal sectional view showing the receptacle of FIG. 1.

FIG. 1 is an exploded perspective view showing an optical connector having a first embodiment of a receptacle according to the present invention. FIG. 2 is an exploded perspective view showing an optical plug of FIG. 1. FIG. 3 is a perspective rear view of the receptacle of FIG. 1. FIG. 4 is the front view of the receptacle of FIG. 1. FIG. 5 is a longitudinal sectional view showing the receptacle of FIG. 1.

Referring to FIG. 1, denoted 1 is an optical connector, for example, used in a multiplex transmission line of an automobile vehicle or the like. The optical connector 1 has an optical plug 2 and a receptacle 3.

The receptacle 3 is remarkably improved in assembling workability as compared with the prior art and provides a less optical loss with a reduced manufacturing cost. The optical connector 1 having the receptacle 3 allows an improved optical communication with a less price.

First, the optical plug 2 will be discussed. The optical plug 2, as illustrated in FIG. 2, has a pair of ferrule assemblies 4, 4, a plug housing 5 for receiving the ferrule assemblies 4, 4, and a spring cap 6 attached onto a rear portion of the plug housing 5.

The ferrule assembly 4 has an optical fiber cable 7, a ferrule 8 attached to a terminal of the optical fiber cable 7, and a spring 9 outwardly attached onto the optical fiber cable 7.

The optical fiber cable 7 consists of a core 10 made of a transparent resin material like a methacrylic resin such as PMMA (polymethyl methacrylic acid), a first synthetic resin sheath 11, and a second synthetic resin sheath 12. The transparent resin material has a stripped terminal to be inserted into the ferrule 8.

The ferrule 8 is also made of a synthetic resin material and has a generally cylindrical, smaller diameter portion 13 and a generally cylindrical, larger diameter portion 14. The smaller diameter portion 13 receives the core 10 of the optical fiber cable 7, and the larger diameter portion 14 receives the first sheath 11. The ferrule 8 and the optical fiber cable 7 are bonded to each other, preventing the optical fiber cable 7 from being drawn out from the ferrule 8.

The larger diameter portion 14 has fore and rear flanges 15, 15 on an outer surface thereof. Between the rear flange 15 and the spring cap 6, there is mounted the spring 9.

The plug housing 5 is a generally rectangular hollow box having a pair of accommodation chambers 16, 16 for receiving the ferrule assemblies 4, 4. The plug housing 5 has a top wall which is unitarily formed with a locking arm 17, a pair of guide rails 18, 18 for the spring cap 6, and a pair of guide flanges 19, 19 for the optical fiber cables 7, 7.

Each side wall of the plug housing 5 has a hook-shaped lock protrusion 20 (only one side protrusion is illustrated hereinafter) for the spring cap 6.

The guide rail 18 is a short rectangular piece extending in the engagement direction of the spring cap 6 from a rear end of the plug housing 5 to a generally middle portion of the housing 5. The guide rail 18 is rising up from the side wall in the same plain as the side wall.

The guide flange 19 is a cantilever plate protrusion for leading the optical fiber cable 7 from the rear end of the plug housing 5. The guide flange 19 has a resiliency to prevent the optical fiber cable 7 from significantly bending upward.

The spring cap 6 consists of a base wall 21 opposing to a lower wall of the plug housing 5, a pair of side walls 22, 22 rising up from each side end of the base wall 21 so as to oppose to the side walls of the plug housing 5, and a rear wall 23 rising up from a rear end of the base wall 21 and joined to ends of the side walls 22, 22. The spring cap 6 is outwardly attached onto a rear portion of the plug housing 5.

The side wall 22 has a locking groove 24 engaging with the lock protrusion 20. The side wall 22 has a guide groove 25 slidingly receiving the guide rail 18 in engagement of the plug housing 5.

Denoted 26 is one of a pair of slits to increase flexibility of the spring cap 6 in engagement with the plug housing 5.

The guide groove 25 has a generally inverted-U-shaped section (not shown) and is extending along the engagement direction of the spring cap 6, which is opened toward the base wall 21. From the fore end of the guide groove 25, the guide rail 18 is inserted, and the back end of the guide groove 25 is closed by the rear wall 23.

The rear wall 23 has a pair of fiber entrances 27, 27 each for inserting the optical fiber cables 7 but abutting against an end of the spring 9. The rear wall 23 is also formed with a pair of supporting portions 28, 28 each having a generally U-shaped section for supporting the optical fiber cables 7, 7 led from the fiber entrances 27, 27.

Next, the receptacle 3 will be discussed. The receptacle 3, as illustrated in FIG. 3, has optical element module sub-assemblies 31, 32 (may be called as a light receiving and emitting optical module, a transmission module, or a Fiber Optic Transceiver) and a connector housing 33 (corresponding to the housing described in the summary of the invention) unitarily receiving the module sub-assemblies 31, 32.

The connector housing 33 has a fore opening 34 (FIG. 4) for inserting the optical plug 2 (see FIG. 1 or FIG. 2). The optical element module sub-assemblies 31, 32 are embedded unitarily in a rear part of the connector housing 33.

Next, the constitution of the receptacle 3 will be discussed in detail.

Referring to FIGS. 3 to 5, the optical element module sub-assemblies 31, 32 have lead pins 37, 38 provided with optical elements 35, 36, molded bodies 39, 40 for protecting the optical elements 35, 36, and cores 41, 42 extending from the molded bodies 39, 40 as corresponding to the optical elements 35, 36.

When the optical element 35 of the lead pin 37 is a light-emitting element (for example, a light-emitting diode (LED) ), the optical element 36 of the lead pin 38 is a light-receiving element (for example, a photodiode (PD)).

The lead pins 37, 38 will be discussed later in descriptions of a manufacturing method of the receptacle.

The molded bodies 39, 40 are made of a transparent resin material (preferably having a refractive index equal to that of the epoxy-resin, optical fiber cable 7) allowing propagation of a ray. The molded bodies 39, 40 each embed generally an upper half of each of the lead pins 37,38 including the optical elements 35, 36.

The cores 41, 42, which are made of the same material as the molded bodies 39, 40, are transparent circular columns each positioned coaxially (not shown) with one of the optical element 35, 36 unitarily formed with the molded bodies 39, 40.

It is noted that the cores 41, 42 each are not limited to a circular column in shape. That is, the cores 41,42 each may have s shape of a generally circular truncated cone converging propagating rays.

Next, the connector housing 33 will be discussed. Referring to FIGS. 3 to 5, The connector housing 33 is made of a transparent resin material having a refractive index smaller than that of the cores 41, 42 and the molded bodies 39.

The cores 41, 42 unitarily received in the connector housing 33 constitute waveguides.

In this embodiment, the connector housing 33 is a generally rectangular box in its outer shape, which has a step in a longitudinal middle thereof. The connector housing 33 has a top wall 43 formed with a guide portion 44 and has left and right walls 45, 46 (the left-hand and right-hand are defined on the basis of the front face of the connector housing 33) formed with generally cylindrical securing portions 47, 47. The connector housing 33 also has a lower wall 48 from which securing pins 49, 49 are protruding toward an opposing board (a not-shown circuit board) connector.

Inside the connector housing 33, there are formed an engagement chamber 50 engaging with the optical plug 2 (see FIG. 1 or FIG. 2) through a fore opening 34 and a pair of receiving cylinders 51, 51 projecting in the engagement chamber 50.

The guide portion 44 is embossed outward on the top wall 43. Inside the guide portion 44, there are formed a pair of guide grooves 52, 52 and a locking groove 53 for the optical plug 2 (FIG. 1 or FIG. 2) opened to the engagement chamber 50.

The engagement chamber 50 is defined to slidingly receive the plug housing 5 of the optical plug 2 (see FIG. 1 or FIG. 2). The engagement chamber 50 is provided with a pair of vertical rising walls 54, 54 at a generally middle portion of the lower wall 48. The receiving cylinders 51, 51 are projecting in the engagement chamber 50 as described above.

Each receiving cylinder 51 is a circular cylinder of which outer and inner surfaces each have a step in its longitudinal direction. A fore smaller diameter portion 55 of the receiving cylinder 51 receives the ferrule 8 (FIG. 2) of the optical plug 2 (see FIG. 1 or FIG. 2). Meanwhile, a rear larger diameter portion 56 (corresponding to a cladding portion described in the summary of the invention) of the receiving cylinder 51 accommodates the core 41 or 42. Thereby, the cores 41, 42 and the rear larger diameter portions 56, 56 define light waveguides.

The receiving cylinder 51 has a central axis coaxial with those of the ferrule 8 (FIG. 2) and the core 41.

It is noted that the waveguide (consisting of the core 41 or 42 and the rear larger diameter portion 56) has an aperture grade numeral (N. A) not smaller than the core 10 (FIG. 2) of the optical fiber cable 7 (for example, the core 10 has an N. A. of 0.6, while the waveguide has an N. A. larger than 0.6).

Next, referring to FIG. 3 or FIG. 8, a manufacturing method (manufacturing steps) of the receptacle 3 (FIG. 3) will be discussed.

In general, a manufacturing method of the receptacle 3 (FIG. 3) includes the steps of forming the lead pin, completing the optical element module sub-assembly, and unitarily assembling the connector housing into the optical element module sub-assembly.

Figure 6:
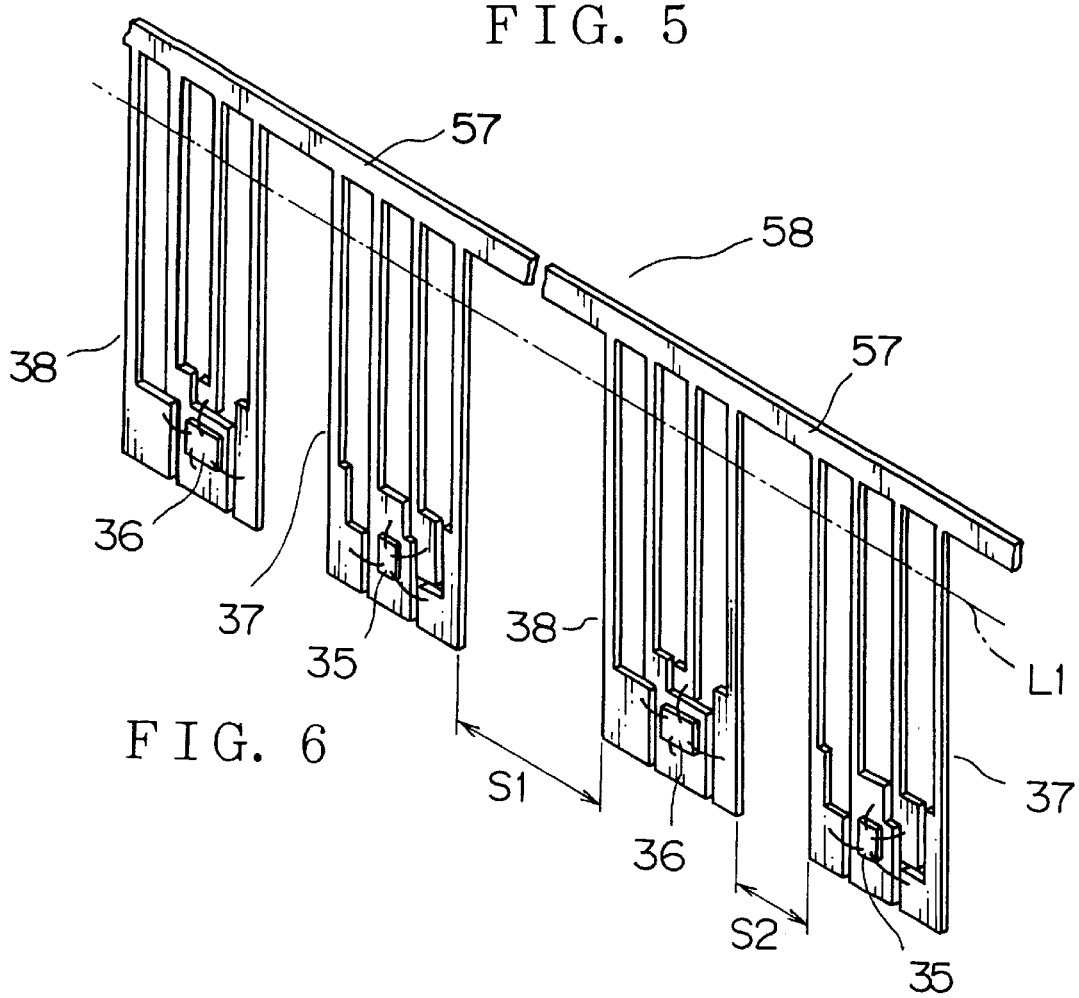
FIG. 6 is a perspective view showing a lead pin which is in a forming step thereof.

Next, the forming step of the lead pin will be discussed in detail. As illustrated in FIG. 6, in the lead pin forming step, a conductive metal plate stamped out by a press is provided with optical elements 35, 36 alternately positioned thereon and secured thereto by wire bonding. Thereby, plural sets of transversely parallel lead pins 37, 38 are formed and have been joined to the carrier 57 (but not limited to this configuration. For example, a plurality of transversely parallel disposed lead pins 37 having only the optical elements 35 secured thereto by wire bonding may be formed).

Denoted 58 is a lead pin assembly having the plural lead pins transversely parallel arranged.

The clearance S1 between adjacent sets of the lead pins 37, 38 is a comparatively larger distance for assembling at once a plurality of the receptacles 3 (FIG. 3). Meanwhile, the clearance S2 between the lead pins 37, 38 is set in such a way that the interval of the optical elements 35, 36 is equal to the pitch of the optical fiber cables 7, 7 (FIG. 2).

The carrier 57 is not cut off in this forming step. That is, the lead pins 37, 38 that have been joined to the carrier 57 are conveyed to the next step.

Thereby, the next step can handle stably the lead pins 37, 38. In addition, the lead pins 37, 38 can be easily supported. Moreover, the optical element module sub-assemblies 31, 32 (FIG. 8) are positioned adequately apart from each other. Furthermore, the molded body 64 (FIG. 9 referred later) is easily molded across the lead pins 37, 38.

A cutting step of the carrier 57 is provided after the next step (the next step may cut off the carrier 57 while the lead pins 37, 38 must be positioned adequately apart from each other). The carrier 57 is cut off along a phantom line L1 shown in FIGS. 6 and 7.

Figure 7:
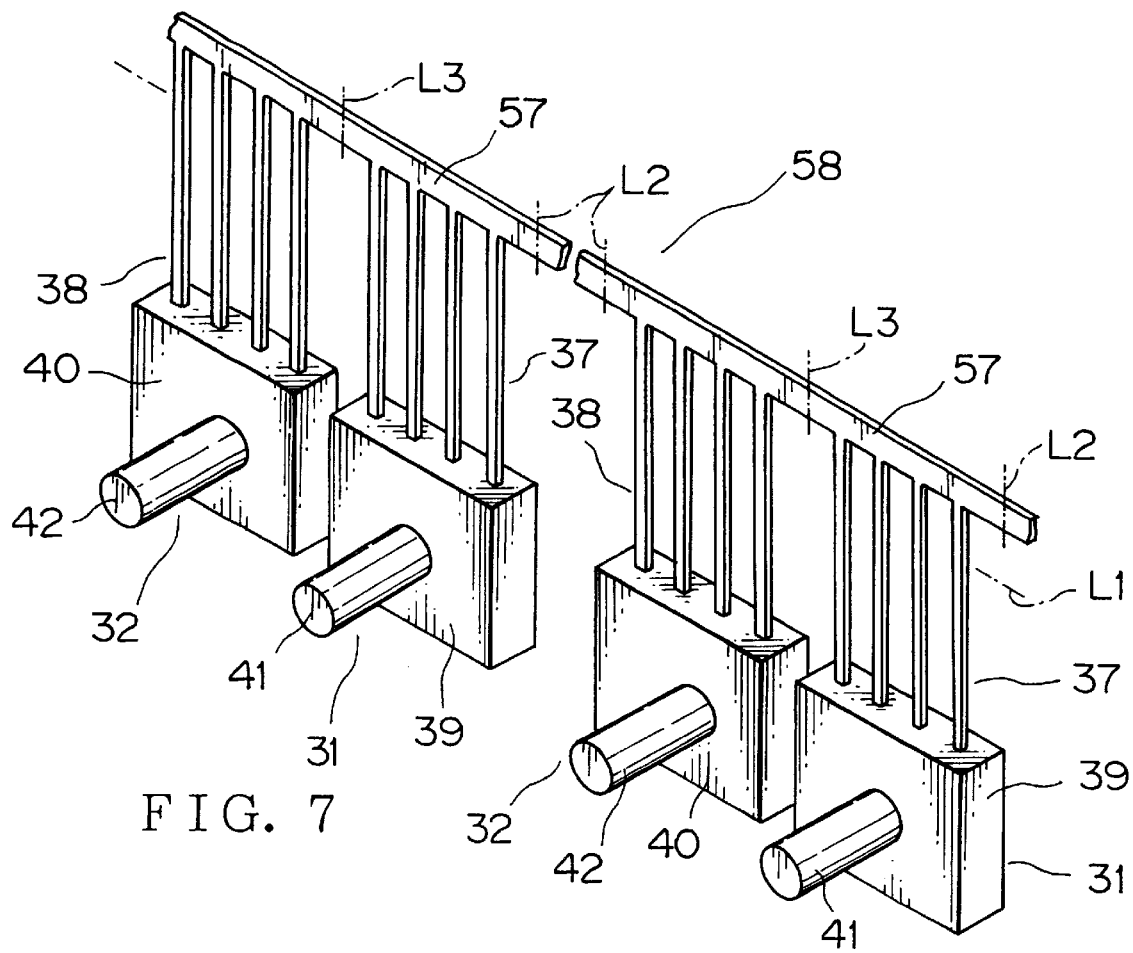
FIG. 7 is a perspective view showing a state in which each lead pin of the lead pin assembly of FIG. 6 is unitarily formed with a molded body and a core to explain a step for manufacturing an optical element module.

As illustrated in FIG. 7, each set of the lead pins 37, 38 may be separated from each other by cutting the carrier 57 along phantom lines L2. Alternatively, the lead pins 37, 38 may be separated from each other by cutting the carrier 57 along phantom lines L2, L3 to define the separated lead pin 37 or 38 having a part of the carrier 57. The cutting-off of the carrier may be carried out in the next step for manufacturing the optical element module sub-assembly.

After the completion of the lead pin forming step, an assembling step for the optical element module sub-assembly will be carried out.

In the sub-assembly step, as illustrated in FIG. 7, each of lead pins 37, 38 is unitarily formed with the molded body 39 or 40 and the core 41 or 42. That is, the lead pins 37, 38 (or a pair of the lead pins 37, 38 or the lead pin assembly 58) are set on a forming metal mold (not shown) to form the molded bodies 39, 40 and the cores 41,42 with a transparent resin material thereon. Thereby, the optical element module sub-assemblies 31, 32 are obtained.

After the manufacturing step of the optical element module sub-assembly, a next step for unitarily assembling the connector housing with the optical element module sub-assembly will be carried out.

Figure 8:
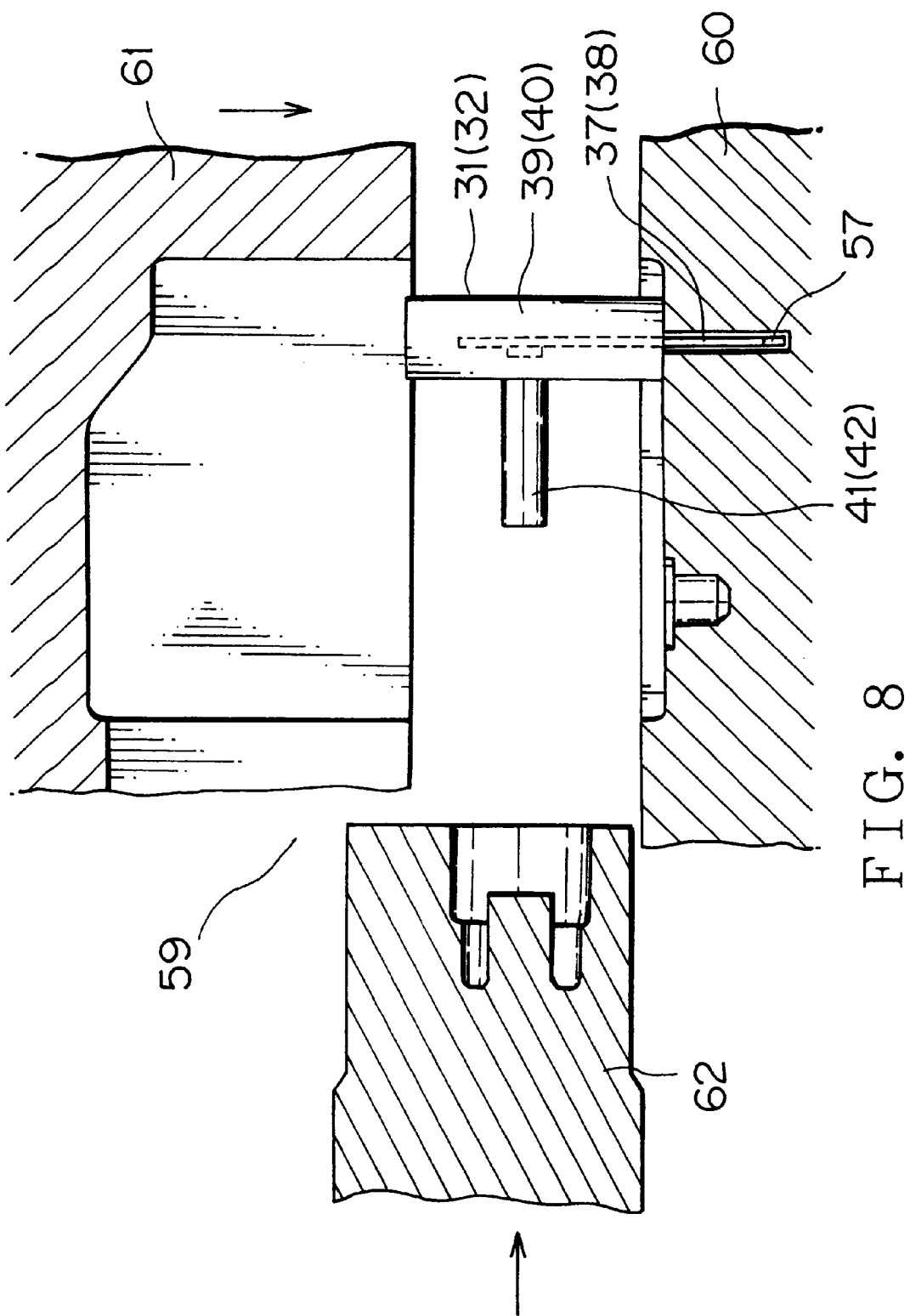
FIG. 8 is a longitudinal sectional view showing housing forming metal molds in which an optical element module sub-assembly is set, and the drawing illustrates a step for unitarily molding the housing with the optical element module sub-assembly.

In the unitarily assembling step, as illustrated in FIG. 8, the optical element module sub-assemblies 31, 32 are set on a housing forming metal mold 59 to unitarily assemble the optical element module sub-assemblies 31, 32 with the connector housing 33 (see FIGS. 3 to 5).

The housing forming metal mold 59 consists of a fixed forming metal mold 60 holding the optical element module sub-assemblies 31, 32, a movable forming metal mold 61 positioned above the fixed forming metal mold 60, and a slidable metal forming mold 62 for molding the engagement chamber 50 (FIG. 5) and the receiving cylinders 51, 51 (FIG. 5). These molds define a space for injecting a transparent resin material having a refractive index smaller than the aforementioned resin material. A material injection entrance (not shown) is provided in a side of the molds.

It is noted that the housing forming metal mold 59 including the fixed forming metal mold 60 having an insertion slot for the lead pins 37, 38 is not limited to the configuration illustrated in FIG. 8.

Finally, the molded assembly is drawn out from the housing forming metal mold 59 and the carrier 57 (not shown) is cut away to complete all the sequential steps of the receptacle 3 (FIG. 3).

It is noted that after all the steps, a conductor coating process step may be provided at least for the connector housing 33.

The conductor coating process is galvanization, vaporization, or the like, which is provided at least on an outer surface of the connector housing 33. Such conductor coated surface corresponds to the conductor coated portion described in the summary of the invention. It is noted that the conductor coating must not be applied to the lead pins 37, 38.

Thereby, at least the connector housing 33 has an electrical conductivity to provide a shield against an external or internal electrical noise, which is effective for an improved optical communication system.

The receptacle 3 obtained by the aforementioned manufacturing method consisting of the smaller number of steps than the prior-art steps allows a lower producing cost and a workability improvement in manufacturing thereof.

Figure 28:
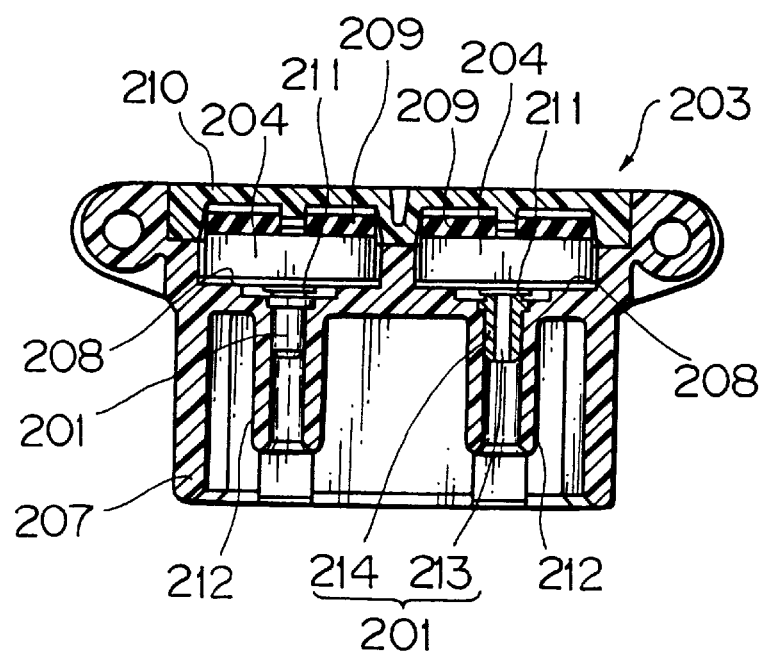
FIG. 28 is a sectional view showing the receptacle of FIG. 27.
Figure 27:
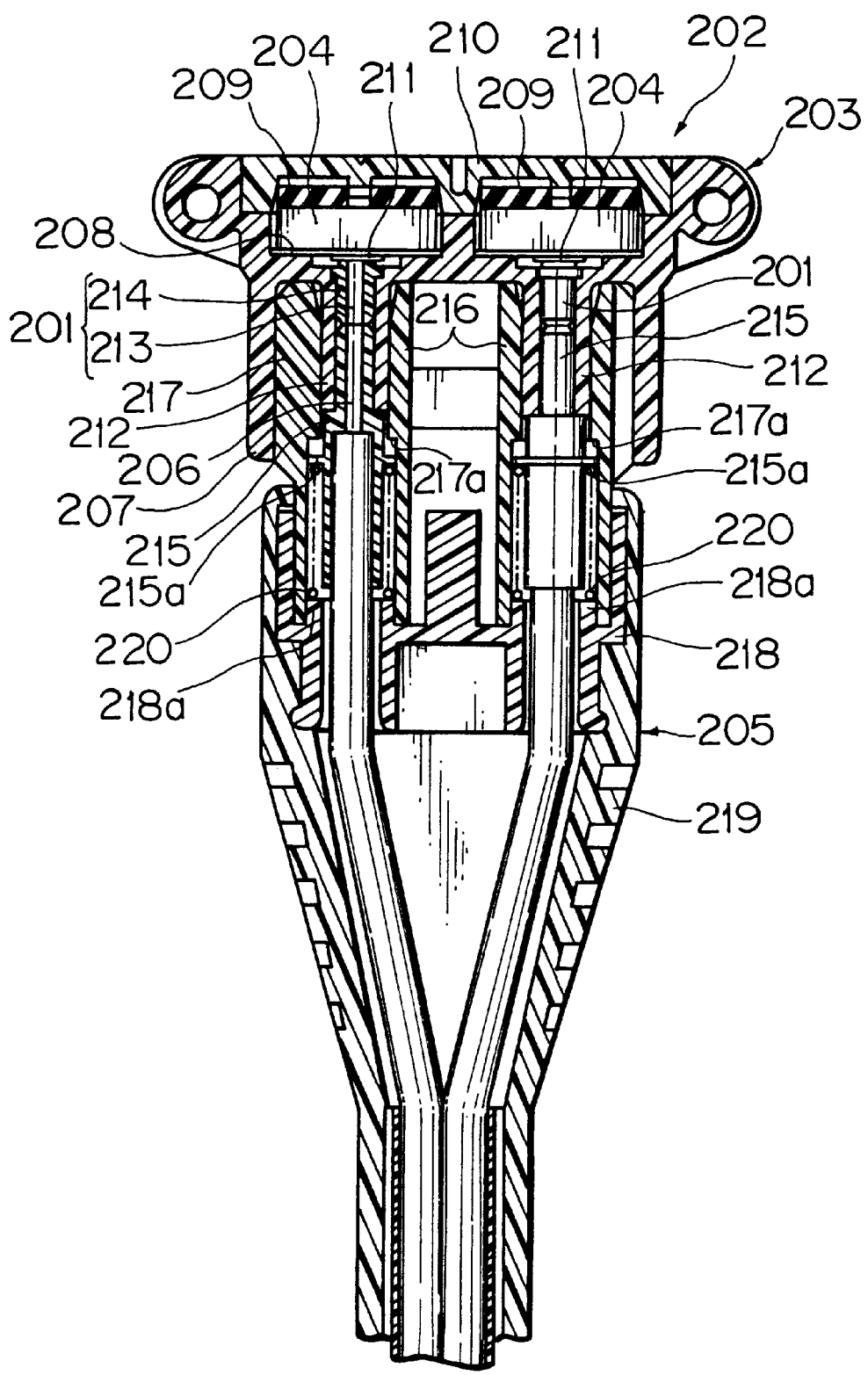
FIG. 27 is a sectional view showing a prior-art optical connector.
Figure 29:
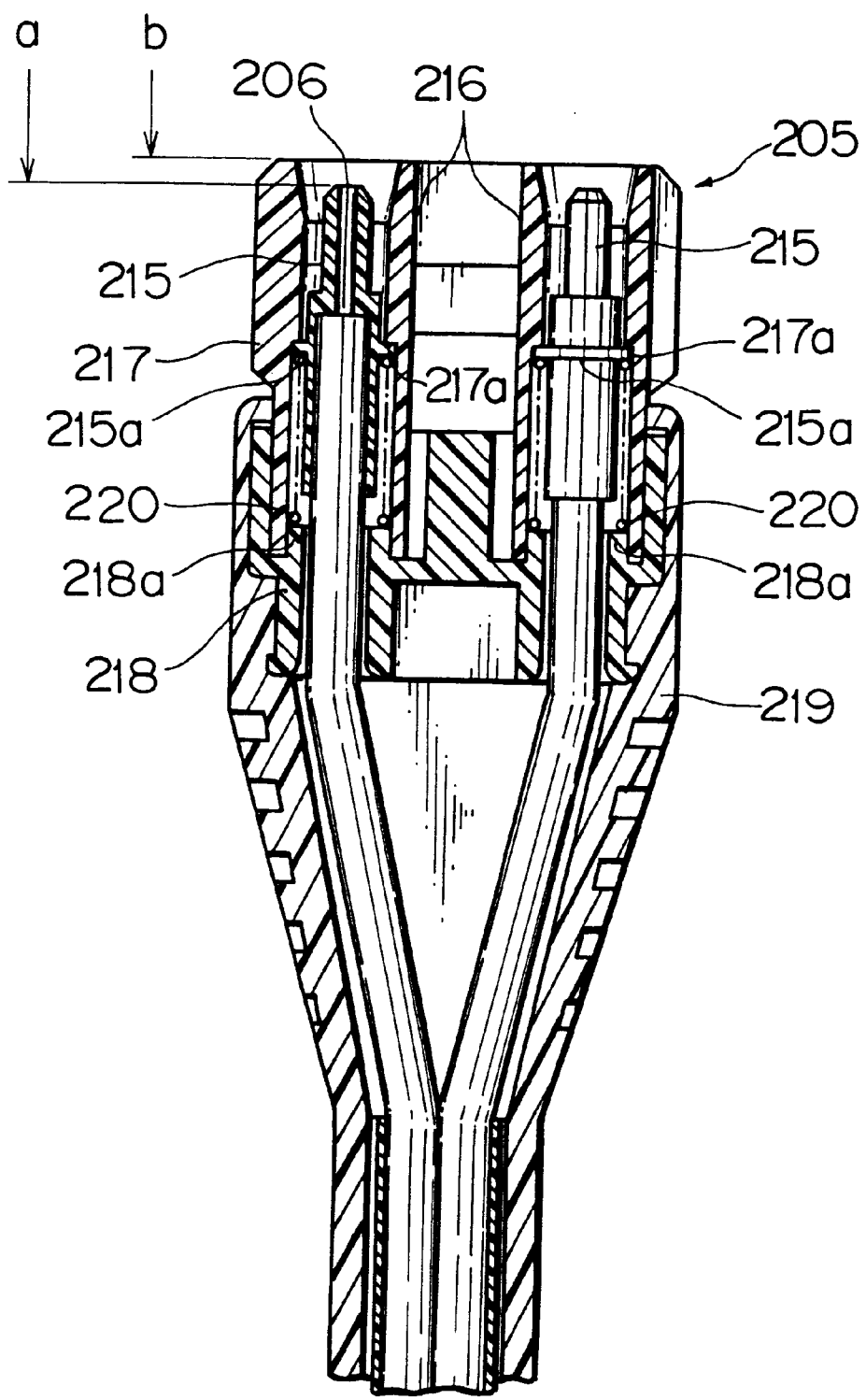
FIG. 29 is a sectional view showing an optical plug of FIG. 27.

That is, the combination of the cores 41, 42 of the optical element module sub-assemblies 31, 32 and the rear larger diameter portions 56, 56 of the connector housing 33 serves as the prior-art sleeve 201 (see FIGS. 12 and 13), eliminating the forming step of the prior-art sleeve 201 (FIGS. 27 and 28). That is, it is unnecessary to grind each end face of the cylindrical holder 214 in which the optical fiber cable 213 (FIGS. 27 and 28) is secured with an adhesive.

Furthermore, the optical element module sub-assemblies 31, 32 unitarily assembled with the connector housing 33 eliminate the forming step of the prior-art cap 210 (FIGS. 27 and 28). Hence, the assembling steps of the receptacle 3 are simpler than those of the prior art, resulted in a workability improvement in assembling thereof.

In addition, there is no such clearance as is defined between the prior art sleeve 201 (FIGS. 27 and 28) and the prior-art optical element module 204 (see FIGS. 27 and 28), minimizing the clearance optical loss within the receptacle 3.

Nevertheless, the receptacle 3 remains the advantageous function of the prior-art sleeve 201 (FIGS. 27 and 28). That is, when the receptacle 3 receives the optical plug 2 in the engagement chamber 50 of the connector housing 33, the receptacle 3 acts in the same way as there would be the prior-art sleeves 201 (FIGS. 27 and 28) opposing to the terminals of the optical fiber cables 7, 7.

Thus, the receptacle and the manufacturing method thereof allow an improvement of the optical connector 1 in optical loss and in producing cost.

That is, the optical connector 1 including the receptacle 3 is less in price but better for an optical communication system.

It is noted that the present invention may be modified without departing from the scope of the present invention.

For example, only one of the optical element module sub-assemblies 31, 32 may be integrally assembled with an associated connector housing (not shown).

Figure 9:
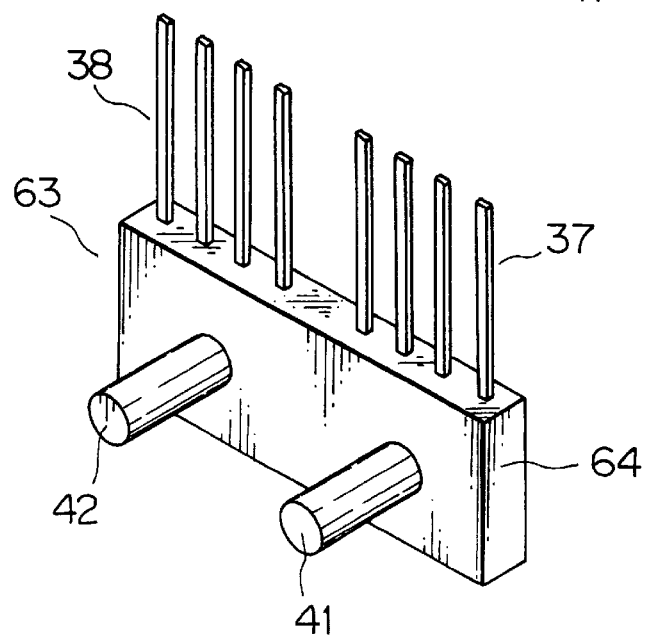
FIG. 9 is a perspective view showing the optical element module sub-assembly having a molded body formed across two of the lead pins.

Moreover, an optical element module sub-assembly 63 illustrated in FIG. 9 may be provided. The optical element module sub-assembly 63 has a plurality of lead pins 37, 38, a molded body 64 molded across lead pins 37, 38, and a pair of cores 41,42 unitarily formed with the molded body 64 (a component basically the same as of the aforementioned embodiment has the same reference numeral).

The optical element module sub-assembly 63 is easily set in the housing forming metal mold 59 (FIG. 8), providing an improvement in manufacturing workability.

It is noted that the connector housing 33 (FIG. 3) made of a transparent material may require a work against a crosstalk. For example, a receptacle 66, which is illustrated in FIGS. 10 and 11, having an embedded shade 65 may be applied to overcome the problem.

The receptacle 66 has a configuration the same as the receptacle 3 (FIG. 3) except the additional embedded shade 65 (a component basically the same as of the aforementioned embodiment has the same reference numeral).

The shade 65 is made of a material for preventing a ray of the optical element 35 (FIG. 6) from entering the optical element 36 (FIG. 6). The shade 65 is positioned between the optical element 35 (FIG. 6) and the optical element 36 (FIG. 6).

Figure 10:
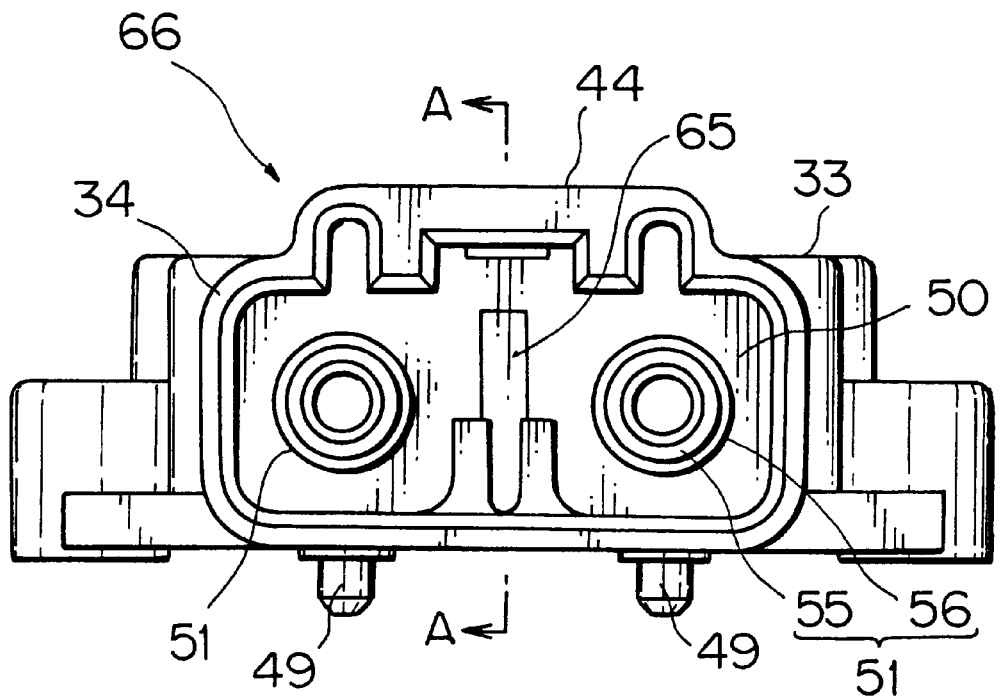
FIG. 10 is a front view showing a receptacle having a shade.
Figure 11:
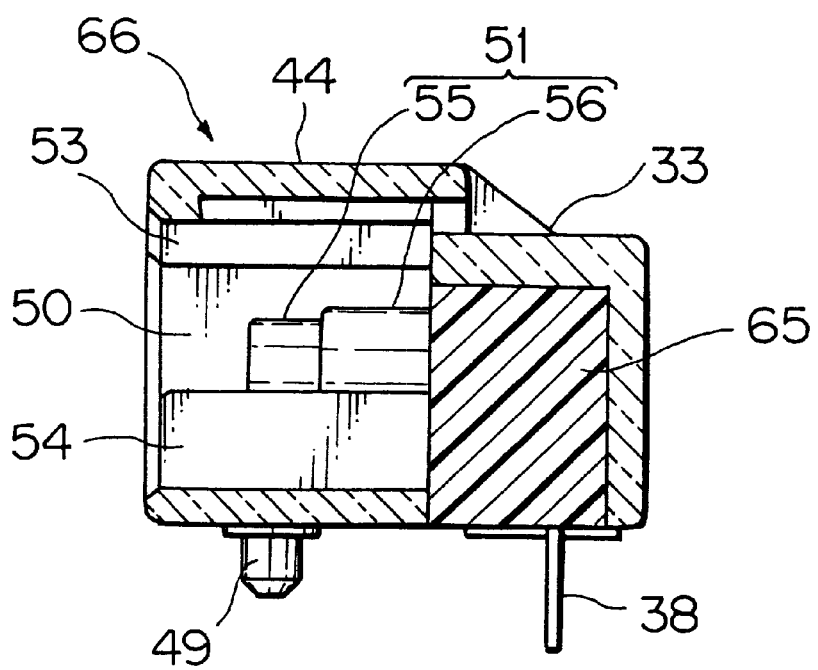
FIG. 11 is a sectional view along line A—A of FIG. 10.

It is noted that the shade 65 is not limited to one illustrated in FIGS. 10 and 11 in shape. In FIG. 11, the shade 65 is extending to reach the intermediate inner wall of the engagement chamber 50, and, for example, it may be extended into the rear larger diameter portions 56, 56 (in this example, since the accommodation chambers 16, 16 (FIG. 2) of the optical plug 2 define a shade, the shade 65 terminates at the intermediate inner wall). Against an external ray, a light-blocking material is coated on an outer surface of the connector housing 33.

As a modified example, the molded body 64 of the optical element module sub-assembly 63 illustrated in FIG. 9 may have an embedded light-blocking member like the shade 65.

Second Embodiment

Referring to the accompanied drawings, a second embodiment of the present invention will be discussed hereinafter.

Figure 12:
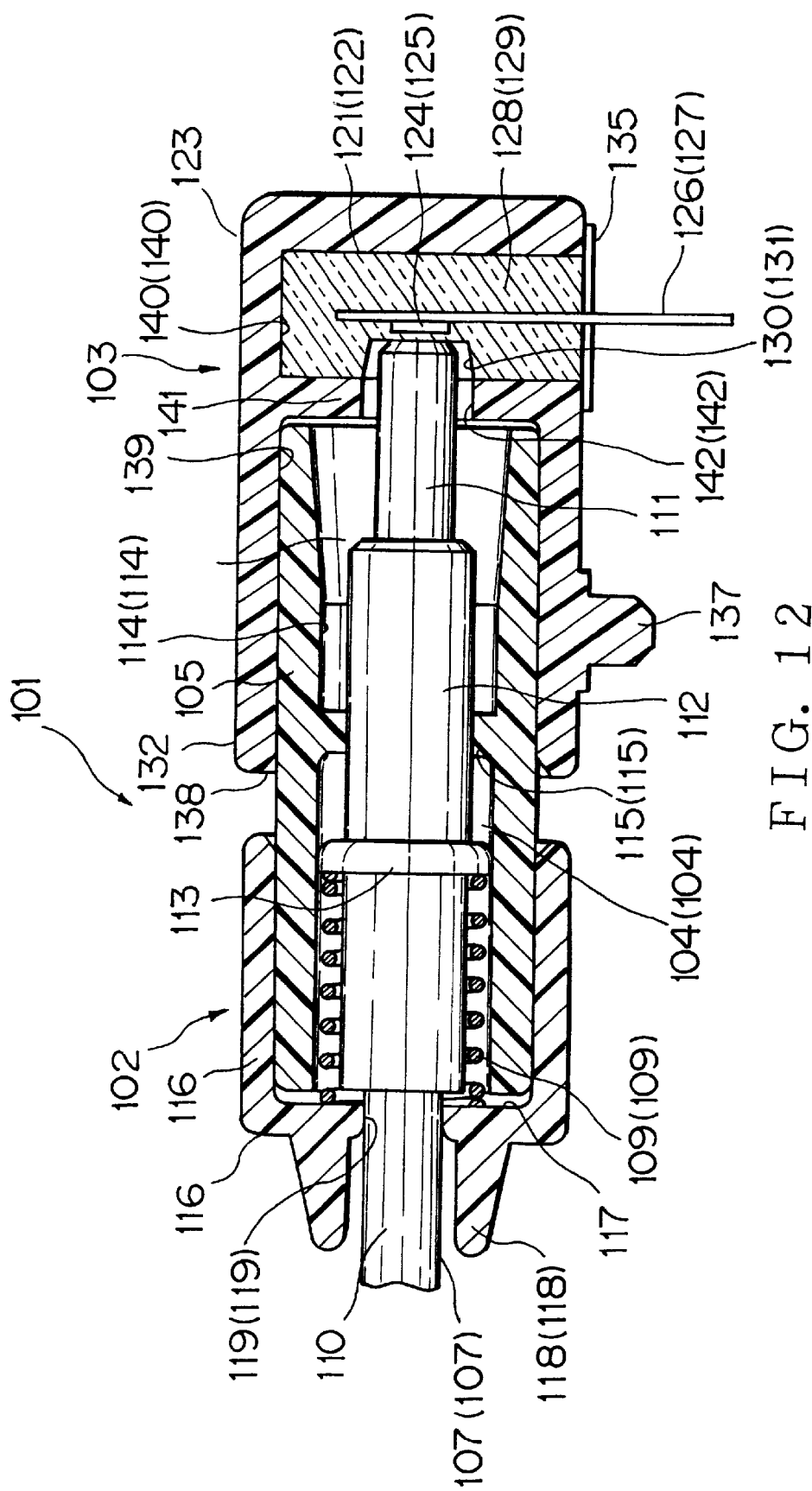
FIG. 12 is a longitudinal sectional view showing a receptacle and an optical connector of a second embodiment of the present invention.
Figure 13:
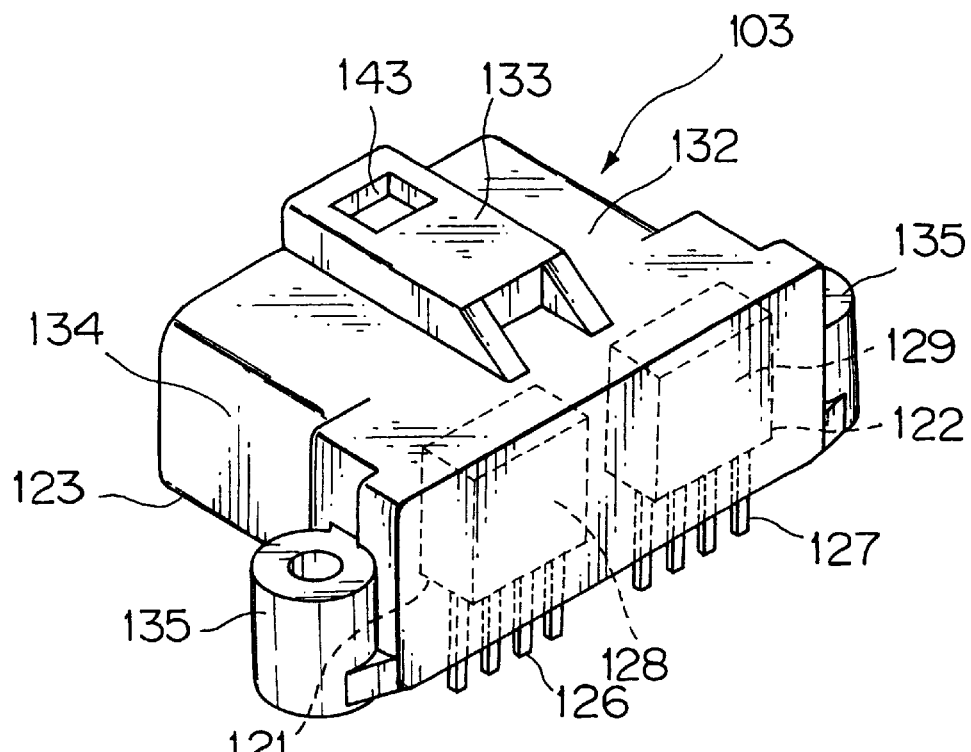
FIG. 13 is a perspective rear view showing a receptacle of FIG. 12.
Figure 14:
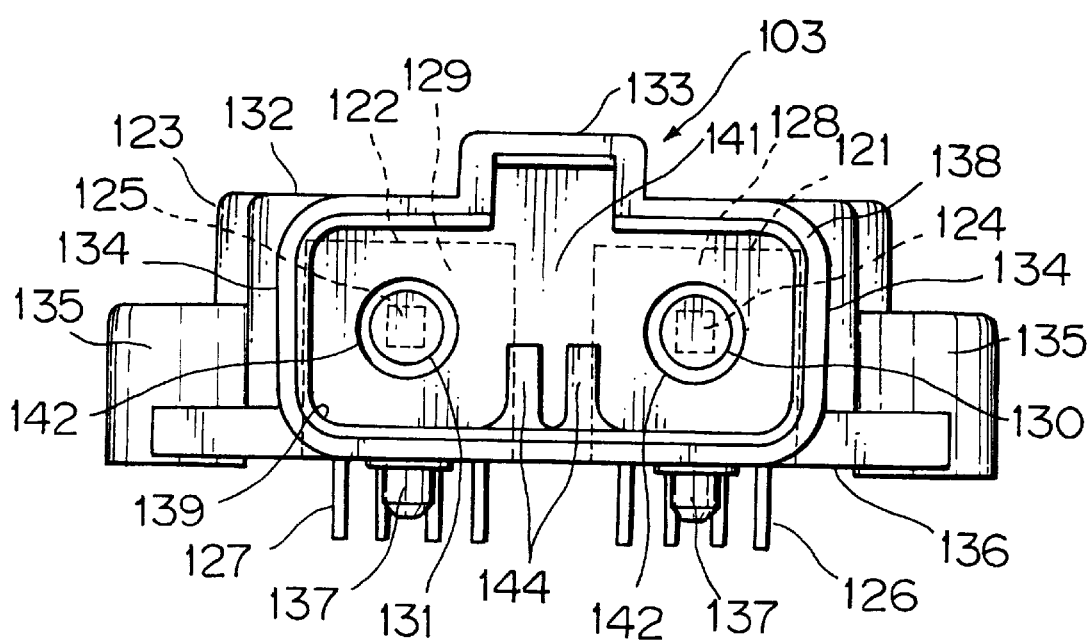
FIG. 14 is the front view showing of the receptacle of FIG. 12.
Figure 15:
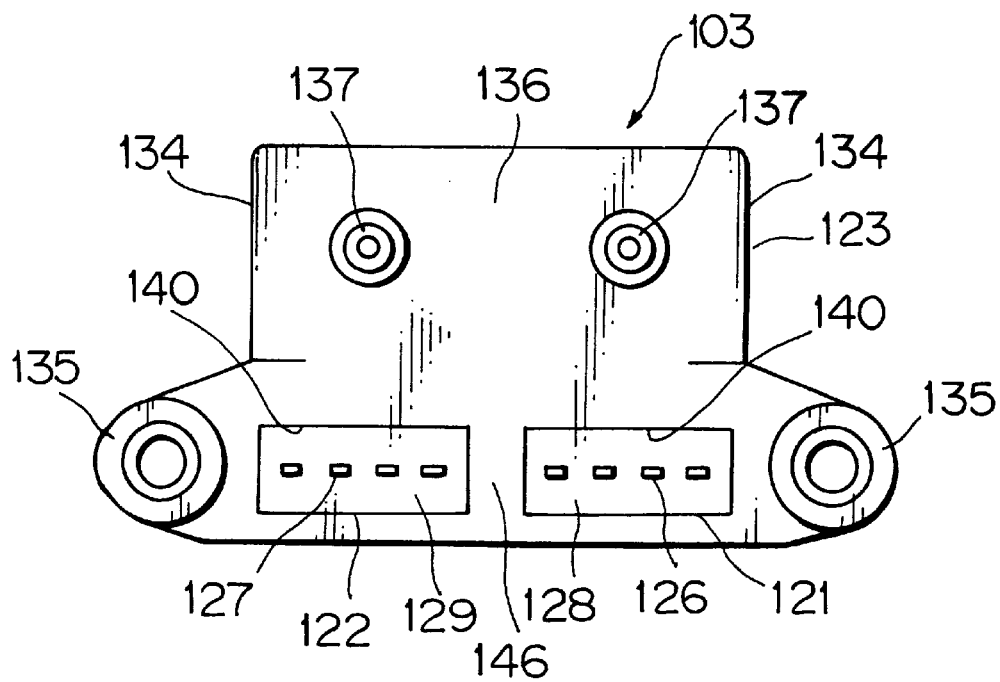
FIG. 15 is a bottom view showing of the receptacle of FIG. 12.
Figure 16:
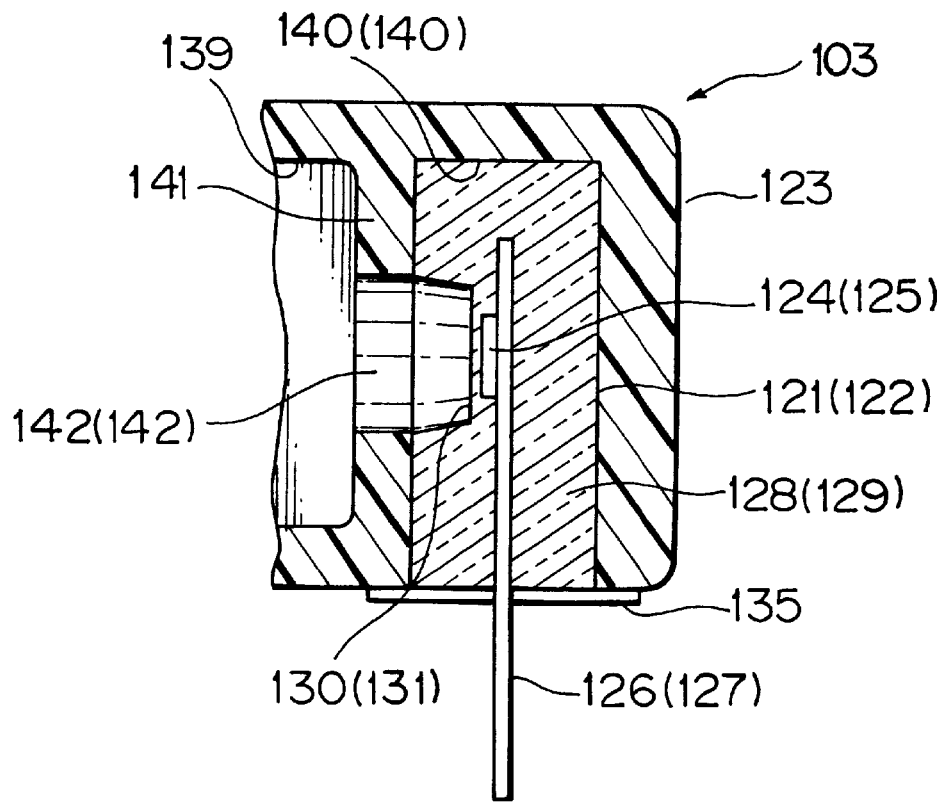
FIG. 16 is an enlarged sectional view showing primary parts of the receptacle of FIG. 12.
Figure 17:
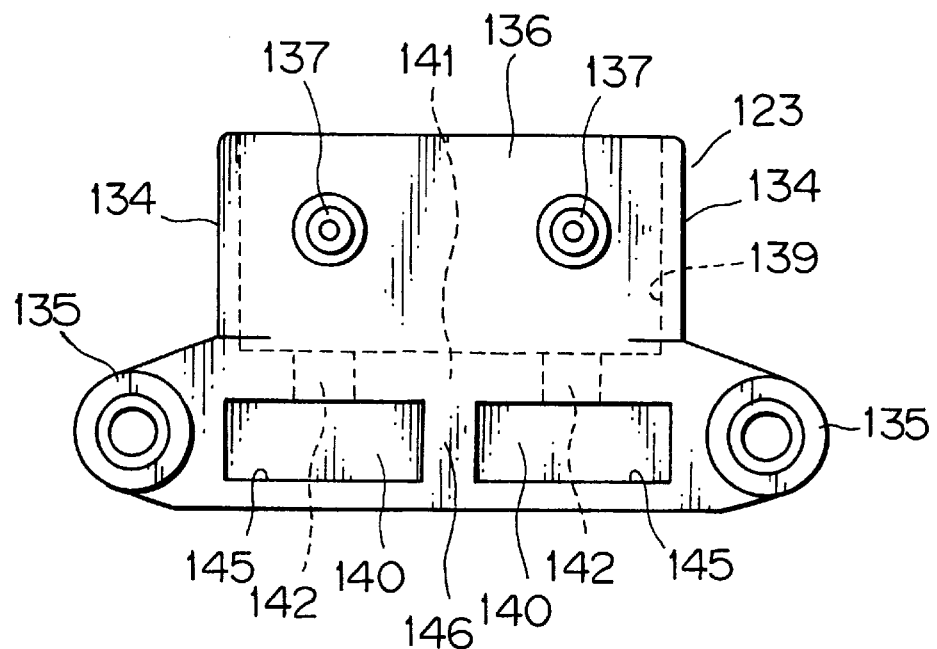
FIG. 17 is a bottom view showing a connector housing.

FIG. 12 is a longitudinal sectional view showing a second embodiment of a receptacle and an optical connector according to the present invention. FIG. 13 is a perspective rear view showing the receptacle of FIG. 12. FIG. 14 is a front view showing the receptacle of FIG. 12. FIG. 15 is a bottom view showing the receptacle of FIG. 12. FIG. 16 is an enlarged view showing a primary part of the receptacle of FIG. 12. FIG. 17 is a bottom view showing a connector housing.

Referring to FIG. 12, denoted 101 is an optical connector, for example, used in a multiplex transmission line of an automobile vehicle or the like. The optical connector 101 has an optical plug 102 and a receptacle 103.

The receptacle 103 is remarkably improved in assembling workability as compared with the prior art and provides a less optical loss with a reduced manufacturing cost. The optical connector 101 having the receptacle 103 allows an improved optical communication with a less price.

First, the optical plug 102 will be discussed. The optical plug 102, as illustrated in FIG. 13, has a pair of ferrule assemblies 104, 104, a plug housing 105 for receiving the ferrule assemblies 104, 104, and a spring cap 106 attached onto a rear portion of the plug housing 105.

The ferrule assembly 104 has an optical fiber cable 107, a ferrule 108 attached to a terminal of the optical fiber cable 107, and a spring 109 attached onto the optical fiber cable 7.

The optical fiber 107 consists of a core (not shown) and a synthetic resin cover 110. The core is made of a transparent resin material like a methacrylic resin such as PMMA (polymethyl methacrylic acid). The optical fiber 107 has a terminal stripped to be inserted into the ferrule 108.

The ferrule 108 is also made of a synthetic resin material and has a generally cylindrical, smaller diameter portion 111 and a generally cylindrical, larger diameter portion 112. The smaller diameter portion 111 receives the core of the optical fiber cable 107, and the larger diameter portion 112 receives the covering 110. The ferrule 108 and the optical fiber cable 107 are bonded to each other, preventing the optical fiber cable 107 from being drawn out from the ferrule 108.

The larger diameter portion 112 has a flange 113 on an outer surface thereof. Between the flange 113 and the spring cap 106, there is mounted the spring 109.

The plug housing 105 is a generally rectangular hollow box having a pair of accommodation chambers 114, 114 (one of them will be illustrated hereinafter) for receiving the ferrule assemblies 104, 104. The plug housing 105 has a top wall which is formed with a locking arm (not shown) locked by a guide 133 (FIG. 13) in engagement with the receptacle 103. The accommodation chambers 114, 114 have stoppers 115, 115 (only one of them is illustrated) abutting against the flange 113 at an inner periphery thereof.

The spring cap 106 has a cap 116 having generally a recess engaging with a rear portion of the plug housing 105, and fiber supporting portions 118, 118 (one of them is illustrated hereinafter) extending from an outer face of an inner wall 117 of the cap 116. The fiber supporting portion 107 has a generally U-shaped section (not shown) for supporting the optical fiber cable 107. The inner wall 117 has fiber entrances 119, 119 (one of them is illustrated hereinafter) each formed by cutting an outer wall of the cap 116 in conformity with the fiber supporting portion 118.

The fiber entrance 119 has an opening smaller than the outer diameter of the ferrule 108. Thus, the fiber entrance 119 has a periphery abutting against a rear end of the ferrule 108 and the other end of the spring 109.

To assemble the optical plug 102, first, the springs 109, 109 are outwardly attached onto the optical fiber cables 107, 107 to form ferrule assemblies 104, 104. The ferrule assemblies 104, 104 are inserted forward into the plug housing 105. Then, the optical fiber cables 107, 107 are inserted into the fiber entrances 119, 119 and the spring cap 106 engages with a rear part of the plug housing 105 to complete the optical plug 102.

Next, the receptacle 103 will be discussed. The receptacle 103, as illustrated in FIG. 13, has optical element module sub-assemblies 121, 122 (may be called as a light receiving and emitting optical module, a transmission module, or a Fiber Optic Transceiver) and a connector housing 123 (corresponding to the housing described in the summary of the inventions) unitarily receiving the module sub-assemblies 131, 132. The connector housing 123 is made of a conductive, synthetic resin material (for example, a carbon contained material). The module sub-assemblies 121, 122 and the connector housing 123 are integrally assembled.

Next, the constitution of the receptacle 103 will be discussed in detail.

Referring to FIGS. 12 to 16, the optical element module sub-assemblies 121, 122 have lead pins 126, 127 provided with optical elements 124, 125 and molded bodies 128, 129 for protecting the optical elements 124, 125. When the optical element 124 of the lead pin 126 is a light-emitting element (for example, a light-emitting diode (LED)), the optical element 125 of the lead pin 127 is a light-receiving element (for example, a photodiode (PD)).

The lead pins 126, 127 will be discussed later in descriptions of a manufacturing method of the receptacle in detail.

The molded bodies 128, 129 are made of a transparent resin material (preferably having a refractive index equal to that of the epoxy-resin optical fiber cable 107) allowing propagation of a ray. The molded bodies 128, 129 each embed generally an upper half of each of the lead pins 126, 127 including the optical elements 124, 125.

The molded bodies 128, 129 have recesses 130, 131 extending inwardly from an outer surface thereof as corresponding to the positions of the optical elements 124, 125. The recesses 130, 131 each has a diameter allowing the insertion of the leading end of the ferrule 108 (preferably, the leading end of the ferrule 108 is not in a press-fit state). In addition, the recesses 130, 131 each have an inner vertical wall parallel to the optical element 124 or 125. The inner vertical wall contacts a leading end (an exposed end of the not-shown core) of the ferrule 108.

Next, the connector housing 123 will be discussed.

Referring to FIGS. 12 to 17, the connector housing 123 of the second embodiment is a generally rectangular box in its outer shape, which has a step in a longitudinal middle thereof. The connector housing 123 has a top wall 132 formed with a guide portion 133 and has side walls 134, 134 formed with generally cylindrical securing portions 35, 35. The connector housing 123 also has a lower wall 36 from which securing pins 137, 137 are protruding toward an opposing board (circuit board) connector.

Inside the connector housing 123, there are formed an engagement chamber 139 engaging with the optical plug 102 (FIG. 12) through a fore opening 138. The connector housing 123 has receiving spaces 140, 140 for accommodating the optical element modules 121, 122 at a rear part thereof. The engagement chamber 139 has an inner wall 141 formed with through holes 142, 142 communicating the engagement chamber 139 with the receiving spaces 140, 140.

The guide portion 133 has a rectangular engagement hole 143 to lock the locking arm (not shown).

The engagement chamber 139 is defined to slidingly receive the plug housing 105 of the optical plug 102 (FIG. 12). The engagement chamber 139 is provided with a pair of vertical rising walls 144, 144 at a generally middle portion of the lower wall 136.

The receiving spaces 140, 140 each have a shape to match the profile of the molded body 128 or 129 and have a U-shaped section with a deep depth. The entrance openings 145, 145 of the receiving spaces 140, 140 are provided in the lower wall 136 to lead the lead pins 126, 127 toward a not-shown opposing device (circuit board).

The through holes 142, 142 receive the leading ends of the ferrules 108, 108 (FIG. 12) in engagement of the optical plug 102 (FIG. 12) with the recess 139. The through holes 142, 142 each have a diameter equal to the diameter of the recess 130 or 131 of the molded body 128 or 129.

The connector housing 123 has a shade 146 in a rear part thereof. The shade 146 is positioned between the receiving spaces 140, 140 so that no light emitted from the light-emitting element enters the light-receiving element.

On engagement of the receptacle 103 with the optical plug 102 having the aforementioned configuration, the leading ends of the ferrules 108, 108, as illustrated in FIG. 12, are inserted into the recesses 130, 131 via the through holes 142, 142. On engagement completion of the optical plug 102, the locking arm (not shown) is locked to the guide 133 (FIG. 13), and the leading ends of the ferrules 108, 108 each contact the end wall of the receiving recess 130 or 131. That is, the leading ends of the ferrules 108, 108 each have an adequate contact pressure exerted by the springs 109, 109. The leading ends of the ferrules 108, 108 stay at a position close to the optical elements 124, 125.

A brief discussion of a light propagation of the optical connector will be described hereinafter. A light emitted from the optical element 124 propagates through the molded body 128 having a reduced length by forming the recess 130 into the core (not shown) of the optical fiber cable 107. Meanwhile, a ray propagated in the optical fiber cable 107 enters the optical element 125 through the molded body 129 having a reduced length by forming the recess 131.

Next, referring to FIGS. 18 to 20, a manufacturing method (manufacturing steps) of the receptacle 103 (FIG. 13) will be discussed.

In general, a manufacturing method of the receptacle 103 (FIG. 13) includes the steps of forming the lead pin, completing the optical element module sub-assembly, and unitarily assembling the connector housing into the optical element module sub-assembly.

Next, the forming step of the lead pin will be discussed in detail. As illustrated in FIG. 18, in the lead pin forming step, a conductive metal plate stamped out by a press is provided with optical elements 124, 125 alternately arranged thereon and secured thereto by wire bonding. Thereby, plural sets of transversely parallel lead pins 126, 127 are formed and are joined to the carrier 147 (but not limited to this configuration. For example, a plurality of transversely parallel disposed lead pins 126 having only the optical elements 124 may be mounted thereon and secured thereto by wire bonding).

Denoted 148 is a lead pin assembly having the plural lead pins transversely parallel arranged.

The clearance S1 between adjacent sets of the lead pins 126, 127 is a comparatively larger distance for assembling at once a plurality of the receptacles 103 (FIG. 13). Meanwhile, the clearance S2 between the lead pins 126, 127 is set in such a way that the interval of the optical elements 124, 125 is equal to the pitch of the ferule 108, 108 (FIG. 12).

The carrier 147 is not cut off in this forming step. That is, the lead pins 126, 127 that have been joined to the carrier 147 are conveyed to the next step.

Thereby, the next step can handle stably the lead pins 126, 127. In addition, the lead pins 126, 127 can be easily supported. Moreover, the optical element module sub-assemblies 121, 122 (FIG. 13 or FIG. 19) are positioned adequately apart from each other. Furthermore, the molded body 156 (FIG. 24 referred later) is easily molded across the lead pins 126, 127.

A cutting step of the carrier 147 is provided after the next step (the next step may cut off the carrier 147 while the lead pins 126, 127 must be positioned adequately to each other). The carrier 147 is cut off along a phantom line L1 shown in FIGS. 18 and 19.

Figure 19:
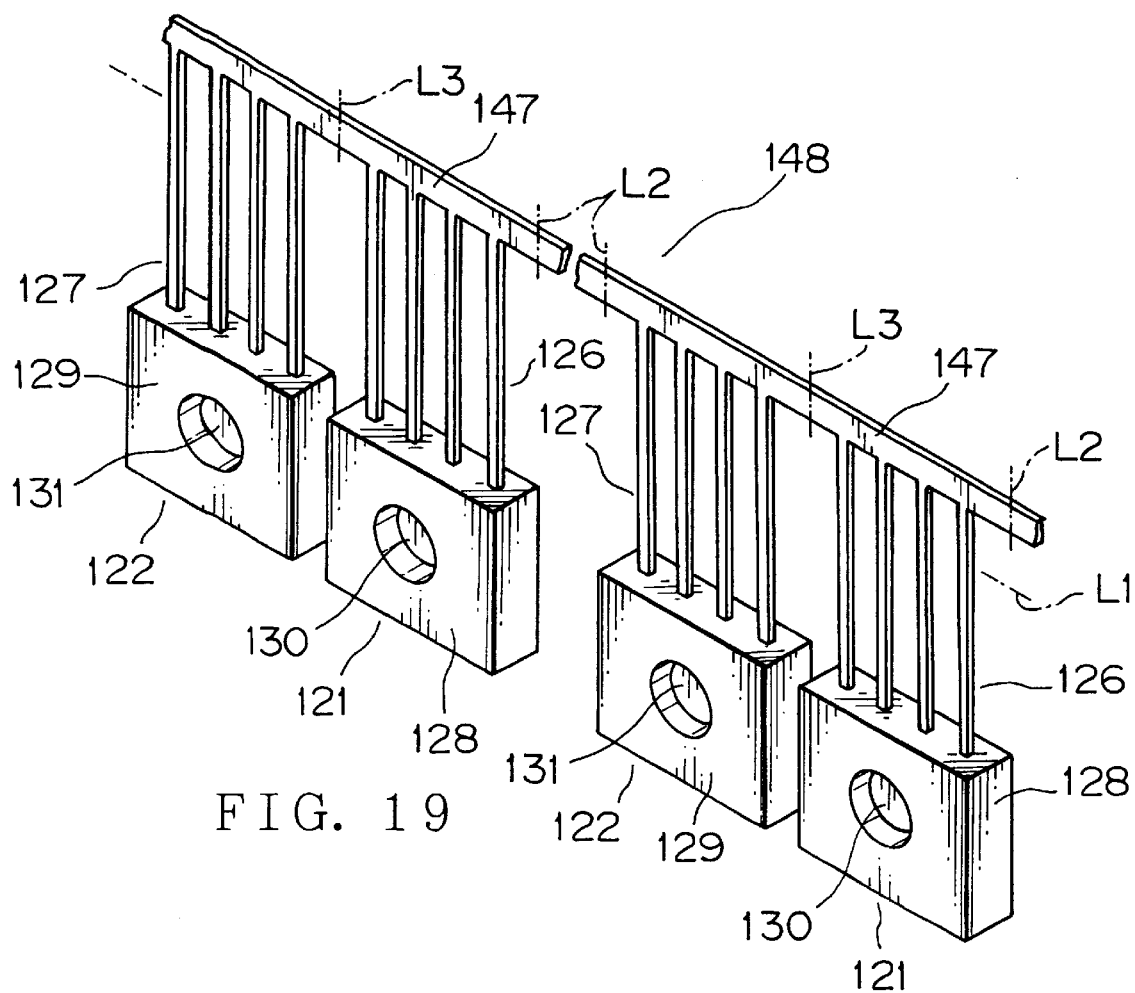
FIG. 19 is a perspective view showing a state in which each lead pin of the lead pin assembly of FIG. 18 is unitarily formed with a molded body having a recess to explain a step for manufacturing the optical element e module.

As illustrated in FIG. 19, each set of the lead pins 126, 27 may be separated from each other by cutting the carrier 47 along phantom lines L2. Alternatively, the lead pins 126, 127 may be separated from each other by cutting the carrier 147 at phantom lines L2, L3 to define the separated lead pin 126, 127 having a part of the carrier 147. The cutting-off of the carrier may be carried out in the next step for manufacturing the optical element module sub-assembly.

After the completion of the lead pin forming step, an assembling step for the optical element module sub-assembly will be carried out.

In the sub-assembly step, as illustrated in FIG. 19, each of lead pins 126, 127 is unitarily formed with the molded body 128 or 129. That is, the lead pins 126, 127 (or a set of lead pins 126, 127 or the lead pin assembly 148) are set on a forming metal mold (not shown) to form the molded bodies 128, 129 with a transparent resin material thereon. Thereby, the optical element module sub-assemblies 121, 122 are obtained.

After the manufacturing step of the optical element module sub-assembly, a next step for unitarily assembling the connector housing with the optical element module sub-assembly will be carried out.

Figure 20:
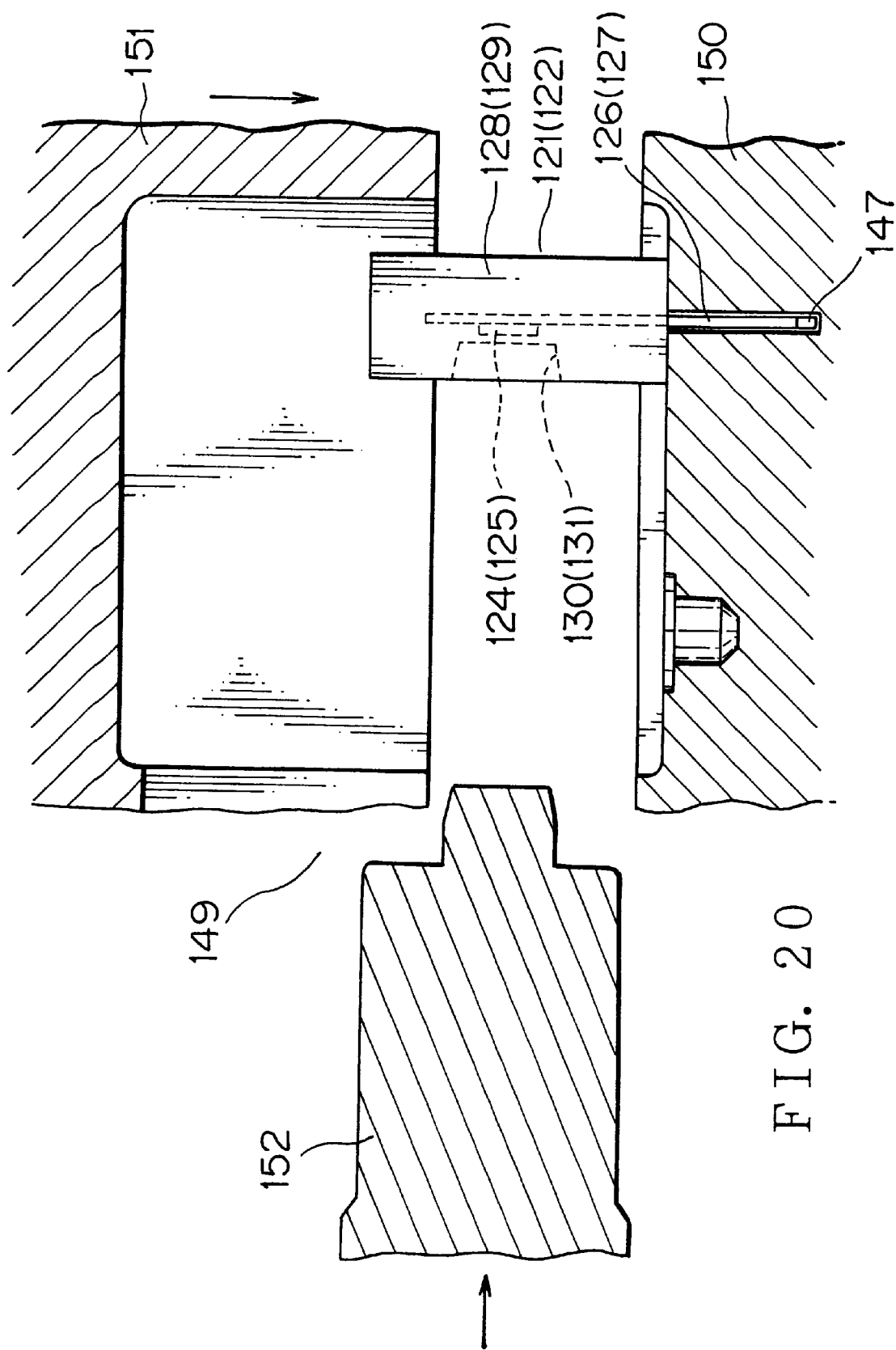
FIG. 20 is a longitudinal sectional view showing housing forming metal molds in which an optical element module sub-assembly is set, and the drawing illustrates a step of unitarily assembling the connector housing with the optical element module sub-assembly.

In the unitarily assembling step, as illustrated in FIG. 20, the optical element module sub-assemblies 121, 122 are set on a housing forming metal mold 149 to unitarily assemble the optical element module sub-assemblies 121, 122 with the connector housing 123 (FIGS. 14 to 16).

The housing forming metal mold 149 consists of a fixed forming metal mold 150 holding the optical element module sub-assemblies 121, 122, a movable forming metal mold 151 positioned above the fixed forming metal mold 150, and a slidable metal forming mold 152 for molding the engagement chamber 139 (FIG. 14) and the insertion through holes 142, 142 (FIG. 14). These molds define a space for injecting a transparent resin material having an electrical conductivity. A material injection entrance (not shown) is provided is a side of the molds. The molded connector housing 123 having an electrical conductivity provides a shield against internal and external electrical noises.

It is noted that the housing forming metal mold 149 including the fixed forming metal mold 150 having an insertion slot for the lead pins 126, 127 is not limited to the configuration illustrated in FIG. 20.

Finally, the molded assembly is drawn out from the housing forming metal mold 149, and the carrier 147 is cut away to complete all the sequential steps of the receptacle 103 (FIG. 13).

The receptacle 103 obtained by the aforementioned manufacturing method consisting of the smaller number of steps than the prior-art steps allows a lower producing cost and a workability improvement in manufacturing thereof.

That is, between the optical elements 124, 125 and the terminals of the optical fiber cables 107, 107, there is not no such a sleeve as the prior-art sleeve 201 (FIGS. 27 and 28) but the molded bodies 128, 129 made of a light-propagating transparent resin material. Thus, the step of the prior-art sleeve 201 (FIGS. 27 and 28) is unnecessary. That is, the optical fiber cable 213 (FIGS. 27 and 28) is bonded to the cylindrical holder 214 (FIGS. 27 and 28), eliminating a precise grinding work of each end of the prior-art sleeve 201.

Furthermore, the optical element module sub-assemblies 121, 122 unitarily assembled with the connector housing 123 eliminate the forming step of the prior-art cap 210 (FIGS. 27 and 28). In addition, the step of the prior-art back sheet 209 (FIGS. 27 and 28) is unnecessary. Hence, the assembling steps of the receptacle 103 are simpler than those of the prior art, resulted in a workability improvement in assembling thereof In addition, as described above, the producing step of the prior-art sleeve 201 (FIGS. 27 and 28) is unnecessary, and there is no such clearance as caused by the prior art sleeve 201 (FIGS. 27 and 28) is defined, minimizing the clearance optical loss within the receptacle 103.

Without the prior-art sleeve 201 (FIGS. 27 and 28), the leading ends of the ferrules 108, 108 of the receptacle 103 assembled by the aforementioned manufacturing method are inserted into the recesses 130, 131 of the molded bodies 128, 129 to closely oppose to the optical elements 124, 125. This provides a more efficient light-propagation.

Thus, the receptacle and the manufacturing method thereof allow an improvement of the optical connector in optical loss and in manufacturing cost.

That is, the optical connector 101 including the receptacle 103 is less in price but better for an optical communication system.

Next, referring to FIGS. 17, 18, and 21, a manufacturing method (manufacturing steps) of another receptacle will be discussed.

In general, a manufacturing method of the another receptacle includes the steps of forming a lead pin, molding a connector housing, receiving the lead pin in a receiving space of the connector housing, and unitarily assembling the connector housing with an optical element module sub-assembly.

Figure 18:
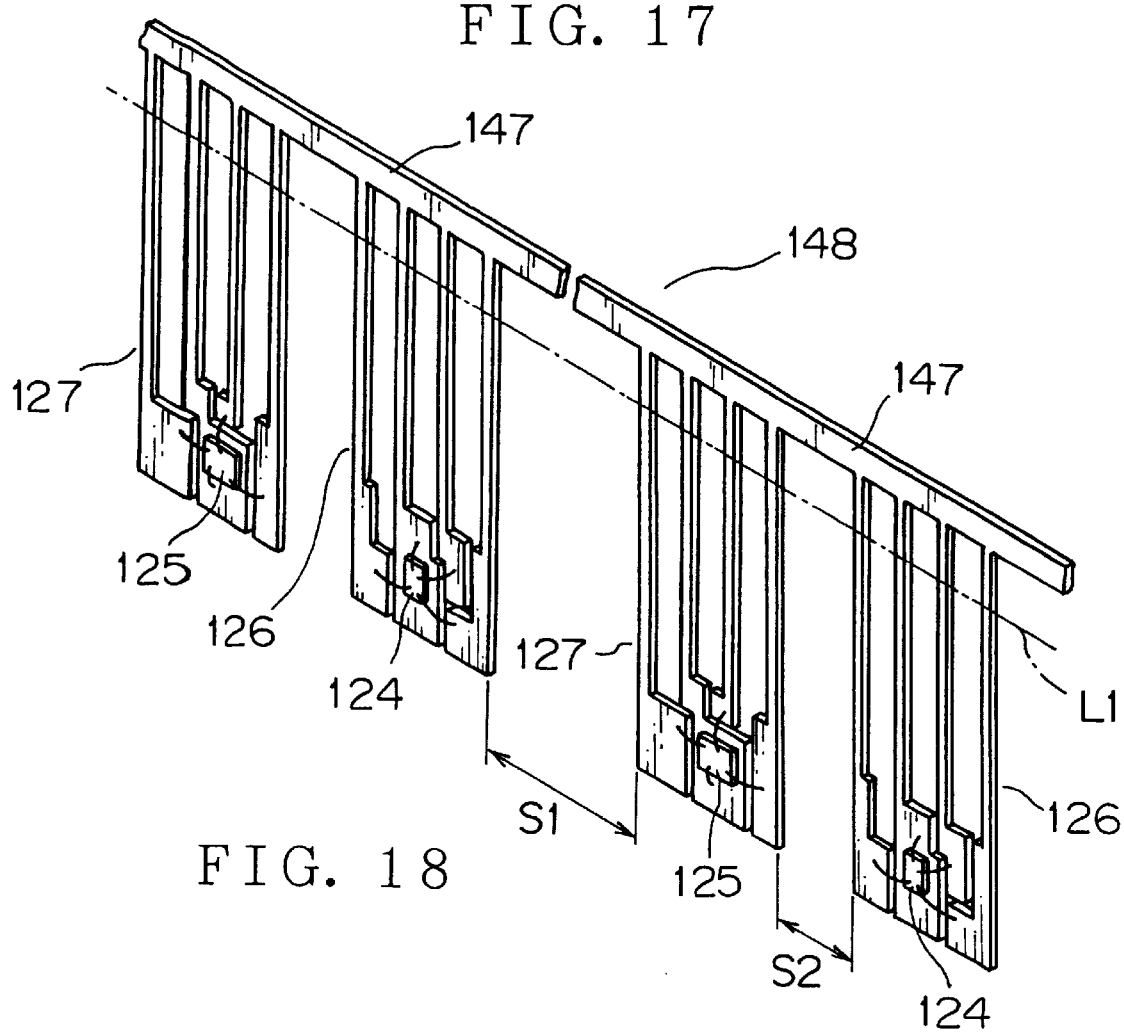
FIG. 18 is a perspective view showing a lead pin assembly for illustrating a forming step thereof.

The lead pin forming step will not be discussed again, because the step has been described in the explanation of FIG. 18.

Next, the connector housing molding step will be discussed. The molding step is carried out separately from the lead pin forming step. An injection mold produces a connector housing 123 shaped as illustrated in FIG. 17 and having an engagement chamber 139, receiving spaces 140, 140, insertion through holes 142, 142, and etc.

After the lead pin forming step and the connector housing molding step, the step of receiving the lead pin in the receiving spaces is carried out.

Figure 21:
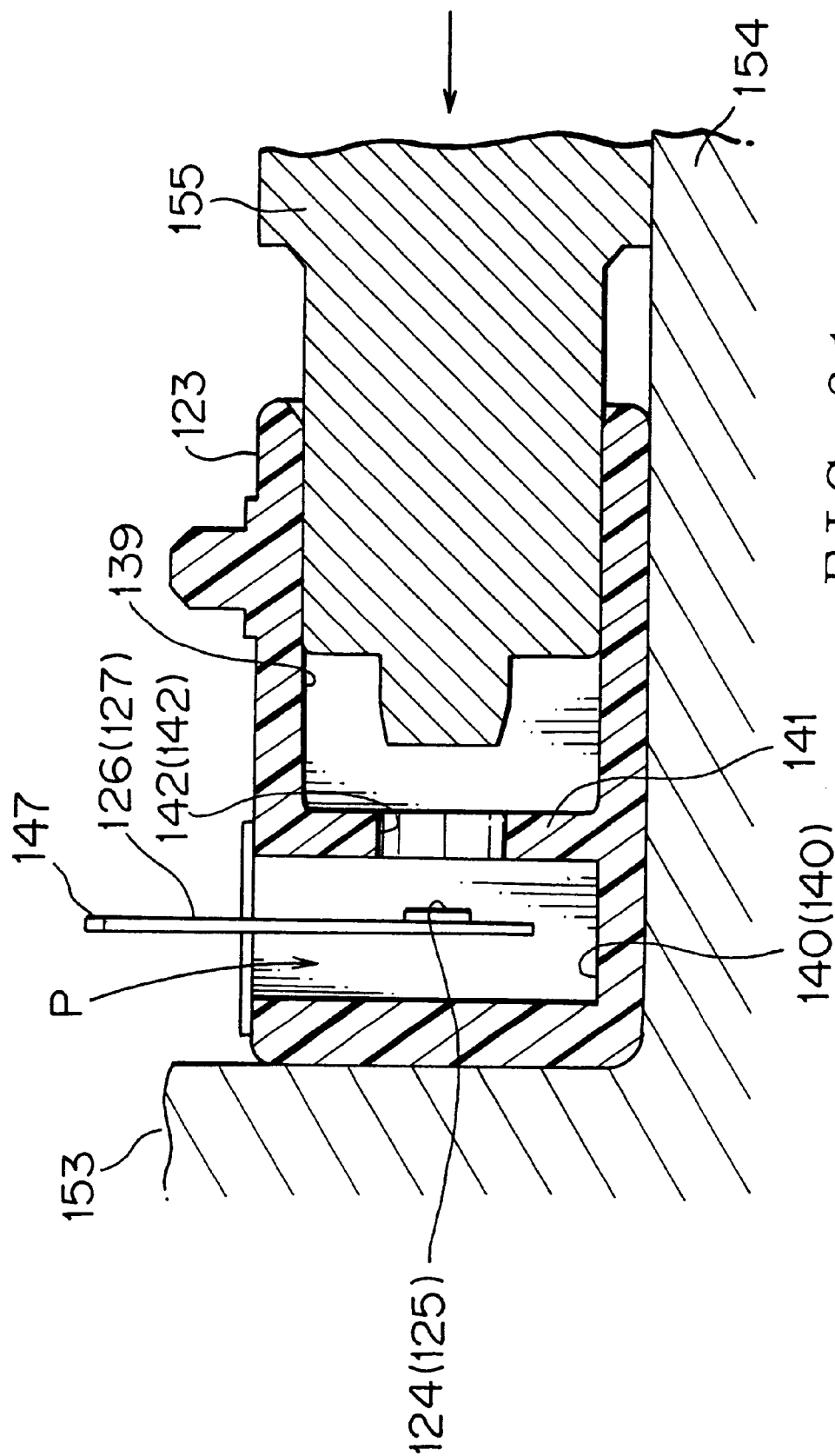
FIG. 21 is a longitudinal sectional view showing housing forming metal molds for a manufacturing method of another receptacle, and the drawing illustrates a step of unitarily molding the connector housing with the optical element module sub-assembly.

In FIG. 21, the receiving spaces 140, 140 of the connector housing 123 receive the optical element (24, 25) sides of the lead pins 126, 127 joined to the carrier 147. The connector housing 123 preliminarily set on the module forming metal mold 153 receives the lead pins 126, 127 in such a way that the optical elements 124, 125 are correctly positioned therein (coaxially with the insertion through holes 142, 142 or the ferrules 108, 108).

The module forming metal mold 153 comprises a fixed forming metal mold 154 for securing the connector housing 123 and a slidable metal forming mold 155. The slidable metal forming mold 155 closes the engagement chamber 139 and the insertion through holes 142, 142 and extends in the receiving spaces 140, 140 to define recesses 130, 311.

It is noted that the module forming metal mold 153 illustrated in FIG. 21 may be another mold.

After the step for receiving the lead pins in the receiving spaces, the step for unitarily assembling the optical element module in the connector housing is carried out.

In the step for unitarily assembling the optical element in the module connector housing, a transparent resin material is filled in the receiving spaces 140, 140 in an arrow P direction (FIG. 21) to mold the molded bodies 128, 129 (FIG. 16). The molding of the molded bodies 128, 129 (FIG. 16) makes the optical element modules 131, 132 (FIG. 13) unitarily join to the connector housing 123 to obtain the receptacle 103 (FIG. 13).

At last, cutting off the carrier 147 completes the manufacturing sequential steps of the receptacle 103 (FIG. 13).

The aforementioned manufacturing method consisting of the smaller number of steps to obtain the receptacle 103 than the prior-art steps allows a lower producing cost and a workability improvement simplifying the manufacturing steps.

That is, between the optical elements 124, 125 and the terminals of the optical fiber cables 107, 107, there is not such a sleeve as the prior-art sleeve 201 (see FIGS. 27 and 28) but there are the molded bodies 128, 129 made of a light-propagating transparent resin material. Thus, the step of the prior-art sleeve 201 (FIGS. 27 and 28) is unnecessary. That is, the optical fiber cable 213 (FIGS. 27 and 28) is bonded to the cylindrical holder 214 (FIGS. 27 and 28), eliminating a precise grinding work of each end of the prior-art sleeve 201.

Furthermore, the optical element module sub-assemblies 121, 122 unitarily assembled with the connector housing 123 eliminate the forming step of the prior-art cap 210 (FIGS. 27 and 28). In addition, the step of the prior-art back sheet 109 (FIGS. 27 and 28) is unnecessary. Hence, the assembling steps of the receptacle 103 are simpler than those of the prior art, resulted in a workability improvement in assembling thereof.

In addition, without the provision of the prior-art sleeve 201 (FIGS. 27 and 28), there is no such clearance as caused by the prior art sleeve 201 (FIGS. 27 and 28), minimizing the clearance optical loss within the receptacle 103.

Without the prior-art sleeve 201 (FIGS. 27 and 28), the leading ends of the ferrules 108, 108 of the receptacle 103 assembled by the aforementioned manufacturing method are inserted into the recesses 130, 131 of the molded bodies 128, 129 to closely oppose to the optical elements 124, 125. This provides a more efficient light-propagation.

Next, another modified embodiment of the receptacle will be discussed.

Figure 22:
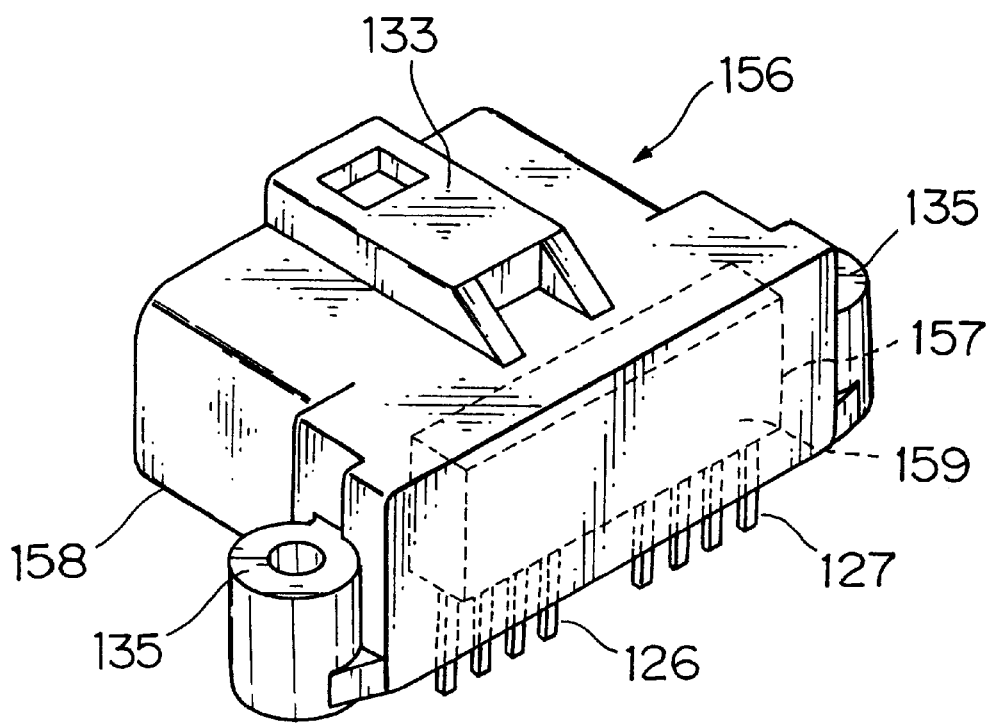
FIG. 22 is a perspective rear view showing the another receptacle.
Figure 23:
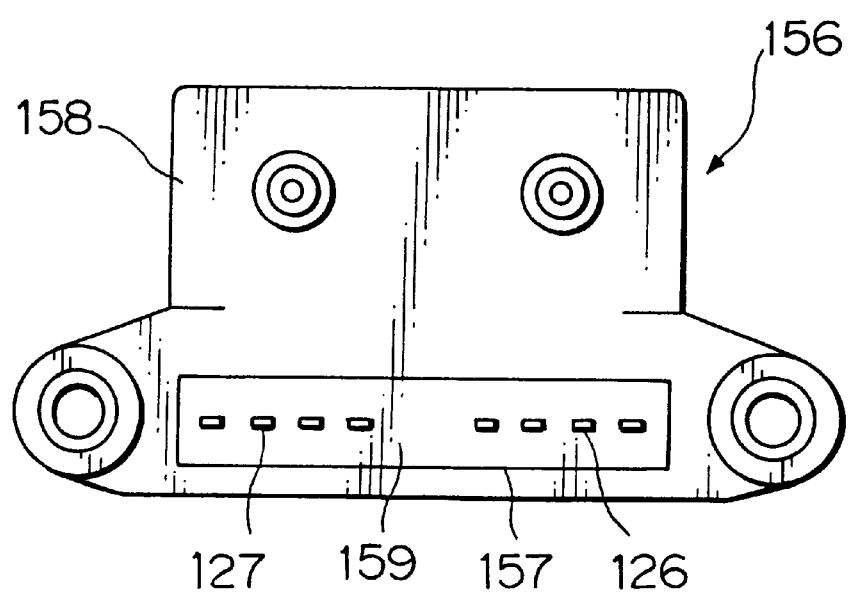
FIG. 23 is a bottom view showing the receptacle of FIG. 22.

Referring to FIGS. 22 and 23, a receptacle 156 comprises another optical element module 157 different from the aforementioned optical element modules 131, 132 and a connector housing 158 (corresponding to the housing described in the summary of the invention).

A reference numeral of the receptacle 156, which is the same as of the receptacle 103, denotes a component basically the same as of the receptacle 103.

Figure 24:
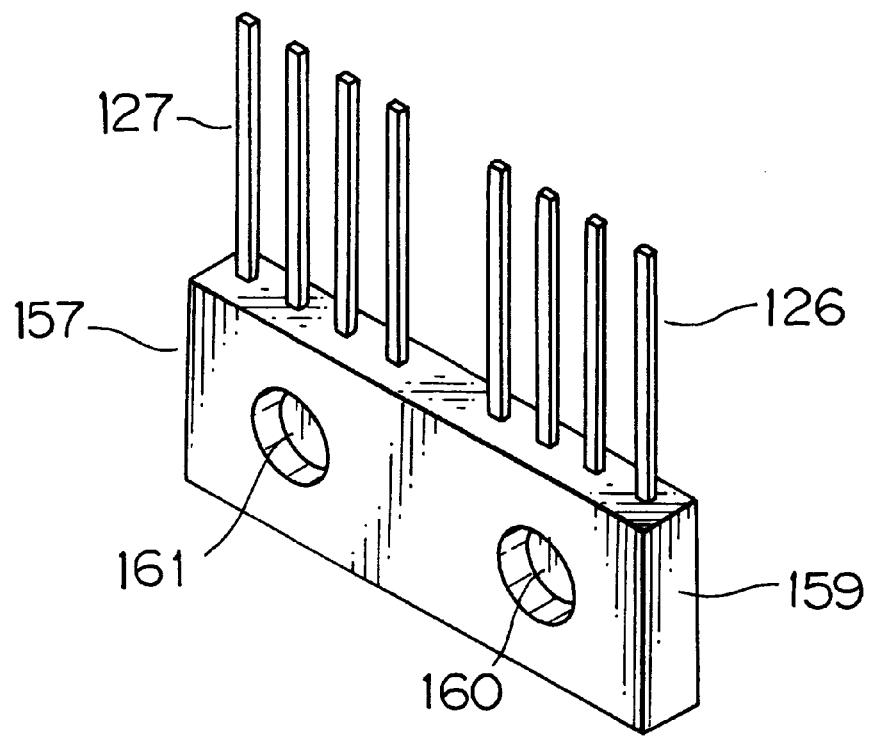
FIG. 24 is a perspective view showing an optical element module of FIG. 22.

The optical element module 157, as illustrated in FIGS. 22 to 24, has lead pins 126, 127 and a molded body 159 made of the transparent resin material. The molded body 159 is molded across the lead pins 126, 127. The molded body 159 has recesses 160, 161 having the same shapes as the recesses 130, 131 (FIG. 19) as corresponding to the lead pins 26, 27.

Figure 25:
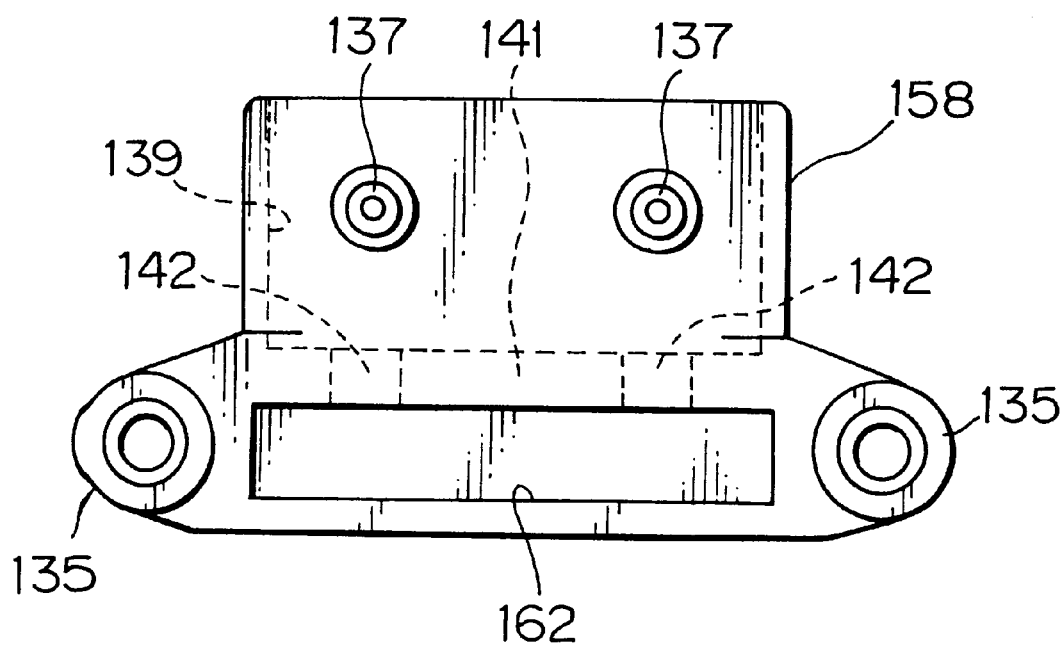
FIG. 25 is a bottom view showing of the receptacle of FIG. 22.

The connector housing 158, as illustrated in FIG. 25, is similar to the connector housing 123 (FIG. 17) except the absence of the shade 146 (FIG. 17). The connector housing 158 has an engagement chamber 139, insertion through holes 142, 142, and a receiving space 162.

In use, the receptacle 156 consisting of the optical element module 157 and the connector housing 158 provides an operational effect similar to the receptacle 103 (FIG. 13). In addition, for example, the optical element module 156 has the advantage that it may be set in a housing forming metal mold at once.

The manufacturing method of the receptacle 156 may be carried out in the same way as the two manufacturing methods described of the receptacle 103 (FIG. 13), which will not be discussed again.

Figure 26:
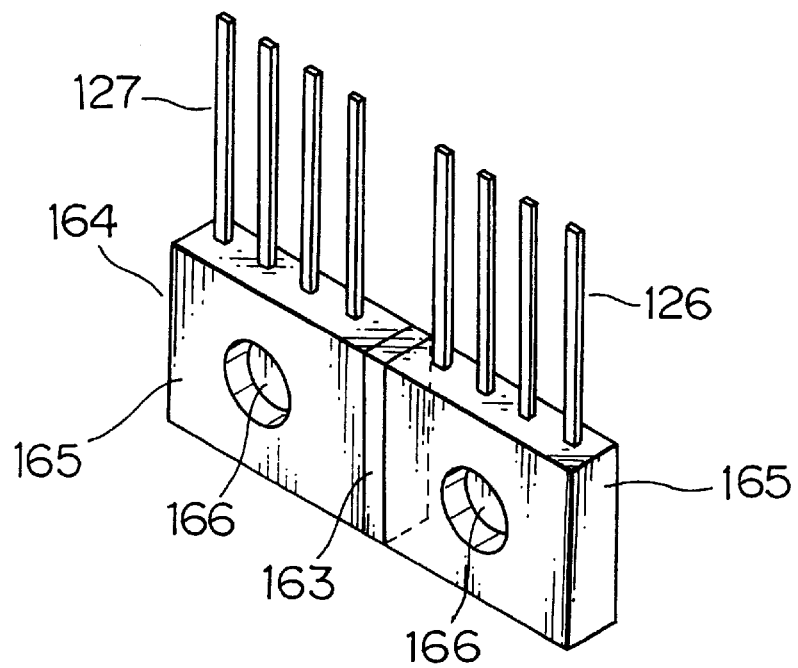
FIG. 26 is a perspective view showing an optical element module having an inside shade.

For preventing a crosstalk problem, as illustrated in FIG. 26, an optical element module 164 having a shade 163 light-blocking member) between the lead pins 126, 127 may be use. The shade 163 of FIG. 26 is unitarily formed with the molded bodies 165, 165. The shade 163 is not limited to one illustrated in FIG. 26 in shape. Numeral 166 denotes a recess.

Note that the present invention can be modified without departing from the scope of the present invention.

For example, one of the optical element modules 121, 122 may be unitarily assembled with an associated connector housing (not shown) to compose the optical connector.

Next, a modified manufacturing method of the receptacle (not shown) will be discussed.

The molded bodies 128, 129 of the optical element modules 121, 122 are molded to have a comparatively shorter length in the longitudinal directions of the lead pins 126, 127. The shorter molded bodies 128, 129 define a stepped area in the receiving spaces 140, 140 of the connector housing 123 when received therein. Filling the stepped area with a resin material completes the receptacle, which is a manufacturing method different from the embodiments described in detail.

What is claimed is:

1. A manufacturing method for a receptacle for receiving an optical plug which is connected to an optical fiber cable and has a ferrule at one end thereof comprising the steps of:

forming a lead pin having an optical element of a light-emitting element or a light-receiving element, forming a molded body and a core to define an optical element module sub-assembly, said molded body protecting said optical element, said molded body and core being made from a light-propagating transparent resin material to be assembled unitarily with said lead pin, said core extending from said molded body in such a direction as to align with said optical element, and forming a transparent housing unitarily with said optical element. module sub-assembly, said housing having a cladding portion surrounding said core and an engagement chamber for said optical plug, said transparent housing having a refractive index smaller than the transparent resin material of said molded body.

2. The receptacle manufacturing method set forth in claim 1, wherein said lead pin is joined to a carrier during the step for forming said lead pin, and said lead pin joined to said carrier is transferred to a next step.

3. The receptacle manufacturing method set forth in claim 2, wherein said carrier is joined a plurality of said lead pins in which said lead pin having said light-emitting element and said lead pin having said light-receiving element are arranged in after one another relationship.

4. The receptacle manufacturing method set forth in claim 2, wherein after said next step, there is provided a cutting step for cutting off said carrier.

5. The receptacle manufacturing method set forth in claim 1, wherein two of lead pins are provided, and there is formed a shade between said light-emitting element and said light-receiving element for separating the optical elements to assemble said optical element module sub-assembly.

6. The receptacle manufacturing method set forth in claims 1, wherein after unitarily assembling said housing with said optical element module sub-assembly, there is provided a conductive coating on said housing.

7. A receptacle for receiving an optical plug which is connected to an optical fiber cable and has a ferrule at one end thereof comprising:

a lead pin having an optical element of a light-emitting element or a light-receiving element, an optical element module sub-assembly having a molded body and a core, said molded body being molded unitarily on said lead pin from a light-propagating transparent resin material for protecting said optical element, said core being molded unitarily with said molded body from said transparent resin material in such a direction as to extend from said molded body, and a transparent housing defined unitarily with said optical element module sub-assembly, said housing having a cladding portion surrounding said core and an engagement chamber for said optical plug, said transparent housing having a refractive index smaller than the transparent resin material of said molded body.

8. The receptacle set forth in claim 7, wherein two of lead pins are provided, and there is formed a shade between said light-emitting element and said light-receiving element for separating the optical elements to assemble said optical element module sub-assembly.

9. The receptacle set forth in claim 7, wherein said housing has at least one conductor coated portion.

10. An optical connector comprising said receptacle manufactured in the receptacle manufacturing method of claim 1 and an optical plug, said optical plug having optical fiber cable which has a ferrule at one end thereof for engaging with said receptacle.

11. An optical connector comprising said receptacle of claim 7 and an optical plug, said optical plug having optical fiber cable which has a ferrule at one end thereof for engaging with said receptacle.

12. A receptacle for receiving an optical plug which is connected to an optical fiber cable and has a ferrule at one end thereof comprising:

a lead pin having an optical element of a light-emitting element or a light-receiving element, an optical element module sub-assembly having a molded body, said molded body being molded unitarily on said lead pin from a light-propagating transparent resin material for protecting said optical element, said molded body having a recess for closely opposing a leading end of said ferrule to said optical element, and a housing having an engagement chamber for receiving said optical plug and a through hole passing the leading end of said optical plug, wherein said optical element module sub-assembly and said housing are unitarily assembled with each other.

13. The receptacle set forth in claim 12, wherein there is provided a shade between said housing and said molded body for separating the optical elements when the receptacle has two of said lead pins.

14. The receptacle set forth in claim 12, wherein said housing is made of an electrically conductive synthetic resin.

15. A manufacturing method of a receptacle for receiving an optical plug which is connected to an optical fiber cable and has a ferrule at one end thereof comprising the steps of:

forming a lead pin having an optical element of a light-emitting element or a light-receiving element, forming an optical element module sub-assembly having a molded body, said molded body being molded from a light-propagating transparent resin material for protecting said optical element to be unitarily assembled with said lead pin, said molded body having a recess for closely opposing a leading end of said ferrule to said optical element, and unitarily molding a housing on said optical element module, said housing having an engagement chamber for receiving said optical plug and a through hole passing through a leading end of said optical plug via said engagement chamber.

16. A manufacturing method for a receptacle for receiving an optical plug which is connected to an optical fiber cable and has a ferrule at one end thereof comprising the steps of:

forming a lead pin having an optical element of a light-emitting element or a light-receiving element, forming a housing, said housing having an engagement chamber for receiving said optical plug, a receiving space for said lead pins, and an insertion hole passing a leading end of said ferrule, said insertion hole communicating with said engagement chamber and said receiving space, receiving said lead pin in said receiving space so as to oppose said optical element to said insertion through hole, and defining an optical element module unitarily in said housing by filing a light-propagating transparent resin material in said receiving space to protect said optical element and by forming a recess for closely opposing a leading end of said ferrule to said optical element.

17. The receptacle manufacturing method set forth in claim 15, wherein there is provided a shade in said housing or said molded body for preventing a ray of said light-emitting element from entering said light-receiving element when the receptacle has two of said lead pins.

18. The receptacle manufacturing method set forth in claim 15, wherein said lead pin is being joined to a carrier defined during the step for forming said lead pin and said lead pin joined to said carrier is transferred to the next step.

19. The receptacle manufacturing method set forth in claim 18, wherein said carrier is joined to two of said lead pins in which said lead pin having said light-emitting element and said lead pin having said light-receiving element are positioned alternately.

20. The receptacle manufacturing method set forth in claim 18, wherein after said next step, there is provided a cutting step for cutting off said carrier.

21. The receptacle manufacturing method set forth in claim 15, wherein said housing is made of an electrically conductive synthetic resin.

22. An optical connector comprising said receptacle of claim 12 and an optical plug, said optical plug having an optical fiber cable which has a ferrule at one end thereof for engaging with said receptacle.

23. An optical connector comprising said receptacle manufactured by the method set forth in claim 16, said optical plug having optical fiber cable which has a ferrule at one end thereof for engaging with said receptacle.

* * * * *